US012810861B2

(12) United States Patent
Kamath et al.

(10) Patent No.: US 12,810,861 B2
(45) Date of Patent: Nov. 24, 2026

(54) HANDLING VOICE INPUT BASED ON SLOTS WITHIN VOICE INPUT BY VOICE ASSISTANT DEVICE

(71) Applicant: SAMSUNG ELECTRONICS CO., LTD., Suwon-si (KR)

(72) Inventors: Vishwanath Pethri Kamath, Bengaluru (IN); Sushant Kumar, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 18/795,487

(22) Filed: Aug. 6, 2024

(65) Prior Publication Data

US 2025/0014578 A1 Jan. 9, 2025

Related U.S. Application Data

(63) Continuation of application No. PCT/KR2024/005800, filed on Apr. 29, 2024.

(30) Foreign Application Priority Data

Jul. 5, 2023 (IN) ............................ 202341045150

(51) Int. Cl.
*G10L 15/22* (2006.01)
*G10L 15/18* (2013.01)

(52) U.S. Cl.
CPC .......... *G10L 15/22* (2013.01); *G10L 15/1815* (2013.01)

(58) Field of Classification Search
CPC ....................................................... G10L 15/22
See application file for complete search history.

(56) References Cited

U.S. PATENT DOCUMENTS 10,553,210 B2 * 2/2020 Chung .................... G06F 40/20
10,783,879 B2 9/2020 Biyani et al.
10,896,675 B1 1/2021 Lam
11,100,384 B2 * 8/2021 Finkelstein ............. G06N 5/04
(Continued)

FOREIGN PATENT DOCUMENTS

KR 10-2022-0150859 A 11/2022

OTHER PUBLICATIONS

International Search Report (PCT/ISA/210) and Written Opinion (PCT/ISA/237) issued by the International Searching Authority on Aug. 12, 2024 in International Application No. PCT/KR2024/005800.

*Primary Examiner* — Douglas Godbold
(74) *Attorney, Agent, or Firm* — Sughrue Mion, PLLC

(57) ABSTRACT

A method for handling voice input by voice assistant device are provided. The method includes receiving, by the voice assistant device, a voice input from a user; identifying, by the voice assistant device, at least one first user intent and a plurality of slots based on the voice input, wherein the plurality of slots may include at least one slot related to the at least one first user intent and at least one slot unrelated to the at least one first user intent; identifying, by the voice assistant device, at least one second user intent based on the voice input and the at least one slot unrelated to the at least one first user intent; and performing, by the voice assistant device, at least one first operation based on the at least one first user intent and at least one second operation based on the at least one second user intent.

20 Claims, 34 Drawing Sheets

(56) References Cited

U.S. PATENT DOCUMENTS

| | | | | |
|---|---|---|---|---|
| 11,410,646 | B1 * | 8/2022 | Erbas | G06F 3/167 |
| 11,443,739 | B1 | 9/2022 | Deller et al. | |
| 11,676,006 | B2 | 6/2023 | Das et al. | |
| 11,985,097 | B2 * | 5/2024 | Aksar | H04L 51/02 |
| 2014/0365209 | A1 * | 12/2014 | Evermann | G06F 40/35 704/9 |
| 2019/0164540 | A1 * | 5/2019 | Park | G06F 40/284 |
| 2020/0019641 | A1 * | 1/2020 | Tonetti | G06F 40/30 |
| 2020/0395018 | A1 | 12/2020 | Burakov et al. | |
| 2021/0027780 | A1 | 1/2021 | Garcia et al. | |
| 2021/0151041 | A1 * | 5/2021 | Gruber | G10L 15/26 |
| 2021/0287667 | A1 * | 9/2021 | Tan | G10L 15/063 |
| 2021/0295841 | A1 * | 9/2021 | Andreica | G06Q 50/10 |
| 2022/0148590 | A1 | 5/2022 | Mathias et al. | |
| 2023/0362107 | A1 * | 11/2023 | Aksar | G06F 40/30 |
| 2023/0376700 | A1 * | 11/2023 | Bista | G06F 40/284 |

* cited by examiner

HANDLING VOICE INPUT BASED ON SLOTS WITHIN VOICE INPUT BY VOICE ASSISTANT DEVICE

CROSS-REFERENCE TO RELATED APPLICATIONS

This application is a bypass continuation of International Application No. PCT KR2024/005800, filed on Apr. 29, 2024, which is based on and claims priority to Indian Patent Application No. 202341045150, filed on Jul. 5, 2023, in the Intellectual Property Office of India, the disclosures of which are incorporated by reference herein in their entireties.

BACKGROUND

1. Field

The disclosure relates to a voice assistance device. More particularly, the disclosure relates to a system and a method for handling voice input based on slots within a voice input using the voice assistant device.

2. Description of Related Art

In general, a voice assistance feature is an intuitive interface between users and an electronic device. The electronic device with voice assistance feature allows the users to interact with electronic devices using natural language in spoken and/or text forms. For example, a user can access the services of the electronic device by providing a speech input in a natural language form to the voice assistance feature associated with the electronic device. The voice assistance feature performs natural language processing on the user's speech input to determine the user's intent and to convert the user's intent into tasks. The tasks are performed based on one or more functions of the electronic device.

Currently, the user interacts with the electronic device to perform the relevant tasks as per the speech input from the user. For example, using speech to interact with the voice assistance feature, a user typically addresses only a single item, function, or activity at a time. In addition, when the user needs to wait for a virtual assistant task to be completed before moving to another task, such delays lead to limiting efficiency, time-consumption, and frustration for a user attempting to deal with multiple tasks at a time. In existing methods, the voice assistance feature does not perform multiple tasks given by the user in a single command.

SUMMARY

Provided is a system and a method for handling voice input using a voice assistant device. The voice assistant device may receive the voice input from a user and determine an operation based on a first user intent and an operation based on a second user intent to be performed. The system may perform multiple tasks using the received voice input from the user to avoid requiring the user to wait before giving a next input command to the voice assistant device.

According to an aspect of the disclosure, a method for handling voice input by a voice assistant device, includes: receiving, by the voice assistant device, a voice input from a user; identifying, by the voice assistant device, at least one first user intent and a plurality of slots based on the voice input, wherein the plurality of slots may include at least one slot related to the at least one first user intent and at least one slot unrelated to the at least one first user intent; identifying, by the voice assistant device, at least one second user intent based on the voice input and the at least one slot unrelated to the at least one first user intent; and performing, by the voice assistant device, at least one first operation based on the at least one first user intent and at least one second operation based on the at least one second user intent.

The performing, by the voice assistant device, the at least one first operation and the at least one second operation may include: identifying a correlation between the at least one first user intent and the at least one second user intent; identifying, based on the correlation, an order for performing the at least one first operation and the at least one second operation; and performing, based on the order, the at least one first operation and the at least one second operation.

The identifying, by the voice assistant device, the at least one first user intent may include inputting the voice input into a single-intent classifier, and the identifying, by the voice assistant device, the at least one second user intent may include inputting, into the single-intent classifier, the at least one slot unrelated to the at least one first user intent and the at least one slot related to the at least one first user intent.

The method may further include identifying, by the single-intent classifier, at least one domain based on the at least one first user intent and the at least one second user intent.

The method may further include based on the plurality of slots including the at least one slot unrelated to the at least one first user intent, performing, by the voice assistant device, the at least one second operation.

The method may further include, based on the plurality of slots not including the at least one slot unrelated to the at least one first user intent, halting, by the voice assistant device, the at least one second operation.

The identifying the at least one second user intent is performed in parallel with the performing the at least one first operation.

According to an aspect of the disclosure, a voice assistant device includes: at least one memory storing one or more instructions; at least one processor coupled to the at least one memory and configured to execute the one or more instructions, wherein the one or more instructions, when executed by the at least one processor, cause the voice assistant device to:

receive a voice input from a user, identify at least one first user intent and a plurality of slots based on the voice input, wherein the plurality of slots may include at least one slot related to the at least one first user intent and at least one slot unrelated to the at least one first user intent, identify at least one second user intent based on the voice input and the at least one slot unrelated to the at least one first user intent, and perform at least one first operation based on the at least one first user intent and at least one second operation based on the at least one second user intent.

The one or more instructions, when executed by the at least one processor, may further cause the voice assistant device to: identify a correlation between the at least one first user intent and the at least one second user intent; identify, based on the correlation, an order for performing the at least one first operation and the at least one second operation; and perform, based on the order, the at least one first operation and the at least one second operation.

The one or more instructions, when executed by the at least one processor, may further cause the voice assistant device to: identify the at least one first user intent by inputting the voice input into a single-intent classifier, and identify the at least one second user intent by inputting, into the single-intent classifier, the at least one slot unrelated to the at least one first user intent and the at least one slot related to the at least one first user intent.

The one or more instructions, when executed by the at least one processor, may further cause the voice assistant device to identify at least one domain based on the at least one first user intent and the at least one second user intent.

The one or more instructions, when executed by the at least one processor, may further cause the voice assistant device to, based on the plurality of slots including the at least one slot unrelated to the at least one first user intent, perform the at least one second operation.

The one or more instructions, when executed by the at least one processor, may further cause the voice assistant device to, based on the plurality of slots not including the at least one slot unrelated to the at least one first user intent, halt the at least one second operation.

The one or more instructions, when executed by the at least one processor, may further cause the voice assistant device to identify the at least one second user intent while the at least one first operation is performed.

According to an aspect of the disclosure, a non-transitory computer readable medium has instructions stored therein, which when executed by at least one processor cause the at least one processor to execute a method for handling voice input by a voice assistant device, the method including: receiving, by the voice assistant device, a voice input from a user; identifying, by the voice assistant device, at least one first user intent and a plurality of slots based on the voice input, wherein the plurality of slots may include at least one slot related to the at least one first user intent and at least one slot unrelated to the at least one first user intent; identifying, by the voice assistant device, at least one second user intent based on the voice input and the at least one slot unrelated to the at least one first user intent; and performing, by the voice assistant device, at least one first operation based on the at least one first user intent and at least one second operation based on the at least one second user intent.

These and other aspects of the embodiments herein will be better appreciated and understood when considered in conjunction with the following description and the accompanying drawings. It is understood, however, that the following descriptions, are merely illustrative examples and are not of limiting. Various changes and modifications may be made within the scope of the embodiments described herein without departing from the spirit thereof, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
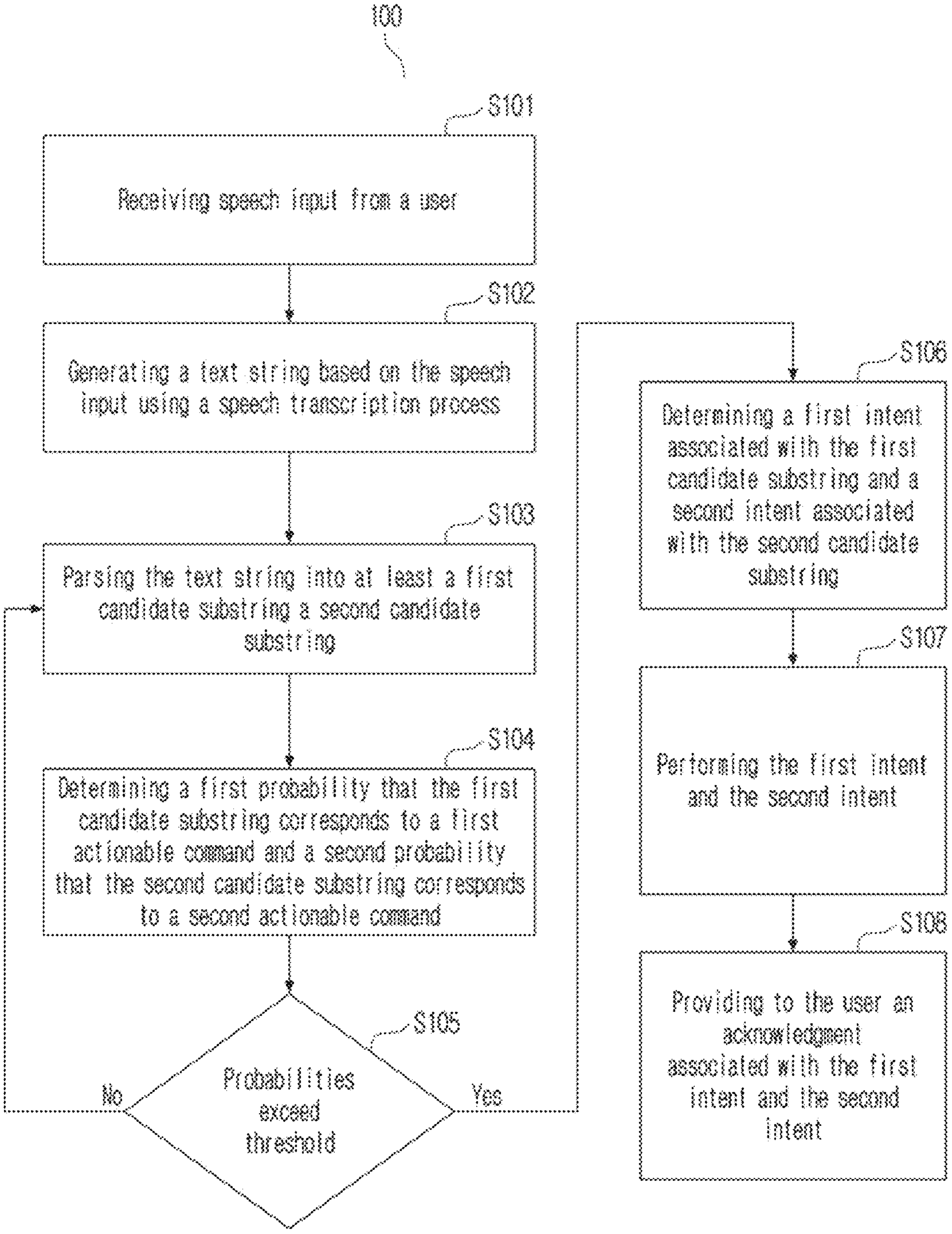
FIG. 1 (RELATED ART)
FIG. 1 is a flow chart illustrating a method for detecting multiple intents, according to the related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as one or more embodiments can be combined with one or more other embodiments to form new embodiments. The term “or” as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples are not be construed as limiting the scope of the embodiments herein.

Herein, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of the disclosure. Furthermore, the elements may have been represented in the drawing by conventional symbols, and the drawings may show only those specific details that are pertinent to the understanding the embodiments of the disclosure so as not to obscure the drawing with details that will be readily apparent to those of ordinary skill in the art having benefit of the description herein.

As is traditional in the field, embodiments are described and illustrated in terms of blocks that carry out a described function or functions. These blocks, which referred to herein as managers, units, modules, hardware components or the like, may be physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, may be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the various embodiments may be physically separated into two or more interacting and discrete blocks without departing from the scope of the proposed method. Likewise, the blocks of the embodiments may be physically combined into more complex blocks without departing from the scope of the proposed method.

The accompanying drawings are used to help easily understand various technical features and it is understood that the embodiments presented herein are not limited by the accompanying drawings. As such, the proposed method is construed to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

Accordingly, the embodiments disclose a method for handling voice input by a voice assistant device. The method includes receiving, by the voice assistant device, a voice input from a user of the voice assistant device. Also, the method includes determining a first user intent and a plurality of slots from received voice input. The plurality of slots includes a slot related to the first user intent and the slot unrelated to the first user intent. Further, the method includes determining a second user intent from the received voice input based on the slot unrelated to the at least one first user intent. The method includes performing operations based on the first user intent and the second user intent.

Accordingly, the embodiments disclose a voice assistant device for handling voice input. The voice assistant device includes a memory, a processor coupled to the memory, a voice assistant controller communicatively coupled to the memory and the processor. The voice assistant controller receives the voice input from the user of the voice assistant device. The voice assistant controller determines the first user intent and the plurality of slots from received voice input. The plurality of slots includes the slot related to the first user intent and the slot unrelated to the first user intent. Also, the voice assistant controller determines the second user intent from the received voice input based on the slot unrelated to the first user intent, Further, the voice assistant controller performs operations based on the at first user intent and the second user intent.

In related art voice recognition devices, an uttered command may be analyzed having multiple intents. The voice recognition device includes a controller configured to receive the uttered command from the user and extracts a plurality of intent data sets from the uttered command. The controller determines a second intent data set from a first intent data set among the extracted plurality of intent data sets and generates a feedback message based on the second intent data set and the first intent data set. Further, the voice recognition device includes a storage that is configured to store the uttered command and the extracted plurality of intent data sets. Also, the voice recognition system includes an output device configured to output the feedback message. In the existing system, the voice recognition device obtains the first slot-value pair for the first command based on the intent and identifies a second value associated with the first slot, but the existing voice recognition device does not process the uttered command again to determine the slot value rather, the voice recognition device uses initially identified slot value for all upcoming intent.

Unlike the related art device, the voice assistant device detects voice input. The voice assistant device determines the first user intent and the slot of the first user intent. The slot of the first user intent is used for determining the second user intent. The second user intent is verified to carry voice input. The performance of an operation based on the first user intent is not affected by the second user intent. The voice assistant device processes the voice input to identify the slot value to determine the first intent and the voice assistant device again processes the slot unrelated to the first intent to determine the slot value for next intent. Hence, the proposed voice assistant device is capable of handling voice input from a single command.

In related art methods, the intent is determined based on a first command. A first slot-value pair is obtained for the first command based on the intent, the first slot-value pair including a first slot and a first value associated with the first slot. A second value associated with the first slot is identified, the second value being identified from a second command that was previously received. In such a scenario, the first slot-value pair for the first command is obtained based on the intent and identifying a second value associated with the first slot. In another related art method, the remote system determines audio data that is received from a voice-controlled device in an environment to identify a first intent associated with a first domain, a second intent associated with a second domain, and a named entity associated with the audio data. The remote system sends the first information to the voice-controlled device for accessing the main content associated with the named entity, and a first instruction corresponding to the first intent. In such a scenario, the remote system determines audio data that is received from the voice-controlled device and multiple intents identified from the audio data. Yet another related art method, multiple input commands are performed to determine the probabilities based on semantic coherence, similarity to user request templates, querying services to determine manageability, or the like. The existing method does not support the different types of domains to perform the task related to the intents.

Unlike, the related art methods, a single command is received from the user for detecting the voice input. The proposed method determines the first user intent and the slot of the first user intent, where the slot of the first user intent is used for determining the second user intent. The second user intent is verified to carry voice input. The first user intent is not affected by the second user intent. Hence, the proposed method has a capable to support different types of domains to perform at least one task related to the intent.

FIG. 1 is a flow chart 100 illustrating a method for detecting multiple intents, according to the related art.

In the related art methods, referring to FIG. 1, at S101, the method includes receiving speech input from the user. At S102, the method includes generating a text string based on the speech input using a speech transcription process. At S103, the method includes parsing the text string into at least a first-candidate substring and a second-candidate substring. At S104, the method includes determining a first probability that the first candidate substring corresponds to a first actionable command and a second probability that the second candidate substring corresponds to a second actionable command. At S105, the method includes determining whether the probabilities exceed a threshold. At S106, the method includes determining a first intent associated with the first candidate substring and a second intent associated with the second candidate substring when the probabilities exceed the threshold. At S107, the method includes performing operations based on the first intent and the second intent (also referred to herein as "performing the first intent" or "performing the second intent"). At S108, the method includes providing the user an acknowledgment associated with the first intent and the second intent. Also, in the existing methods, the first and second intents from the parsed input command are identified in one go. For the contextual dependency of values that need to be reused in the second intent is not possible. Also, the existing system performs command for only one time to identify the entity value of a particular entity type, where the identified entity of respective type is used across multiple intents. In the above approach when an entity value is identified as "Date Time", entity type is used across the first intent and the second intent respectively.

Unlike the related art methods, the proposed method receives the speech input for determining a first user intent and one or more slots based on the received speech input and determining the slots related to the first user intent and the slots unrelated to the first user intent. The method includes performing an operation based on the first user intent along with the slots related to the first user intent and determining a second user intent from the slots unrelated to the first user intent to perform an operation based on the second user intent. In the proposed method, the context is reused from the first user intent to identify the slots to perform an operation based on the second user intent.

Figure 2:
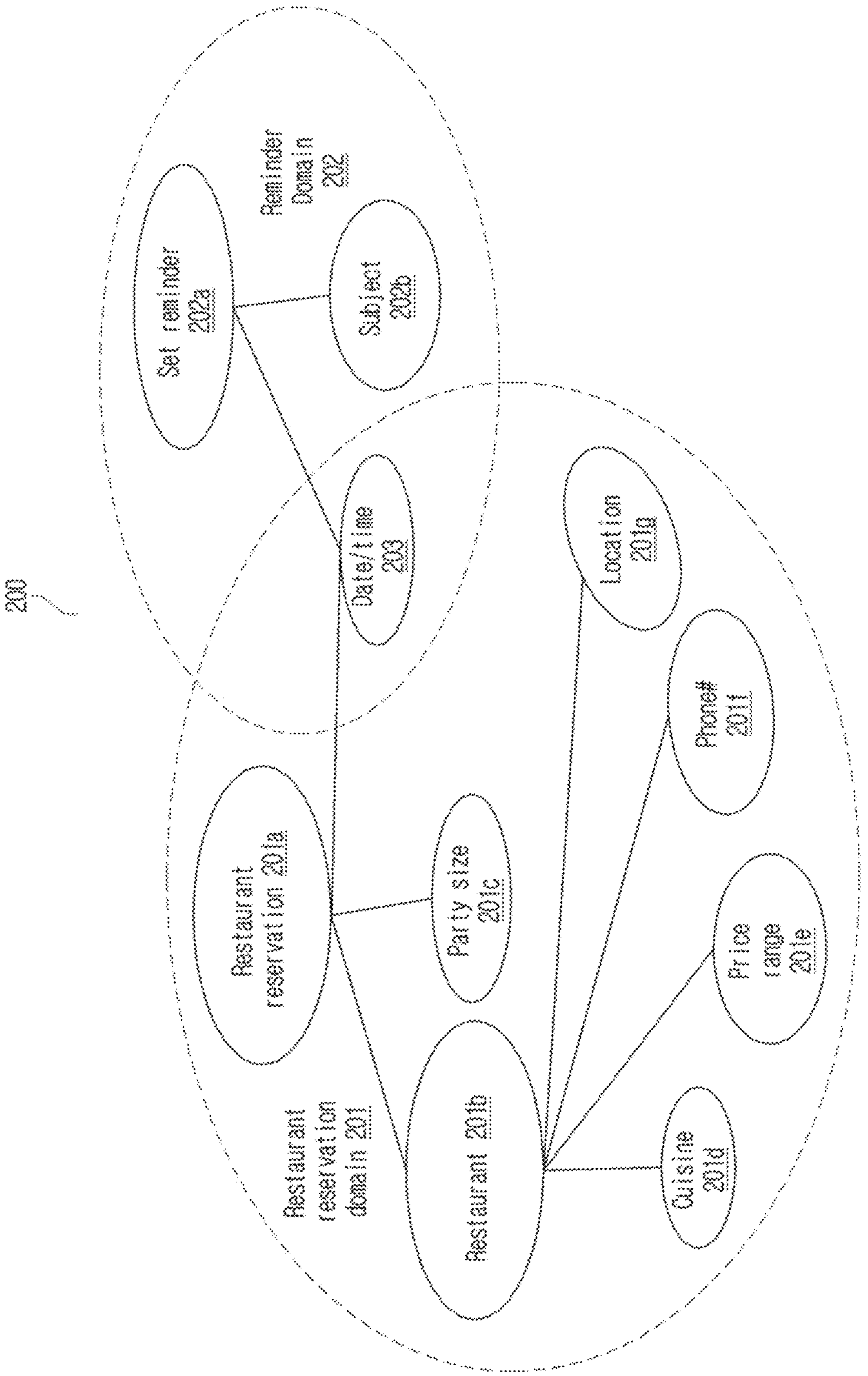
FIG. 2 (RELATED ART)
FIG. 2 is a schematic diagram illustrating a scenario of determining an entity value of a particular entity type to be used across multiple intents, according to the related art.

FIG. 2 is a schematic diagram 200 illustrating a scenario of determining an entity value of a particular entity type to be used across multiple intents, according to the related art as discussed herein.

In the related art methods, the method for determining a command for one time to identify the entity value of the particular entity type and determined entity of respective type is used across multiple intents. For example, referring to FIG. 2, when the user provides the voice input like "Reserve the restaurant by today at 6:00 PM and set reminder". In such a scenario, the entity value is determined as "date/time 203" entity type which is used across both intents "restaurant reservation domain 201" includes information about restaurant reservation 201*a*, restaurant 201*b*, party size 201*c*, cuisine 201*d*, price range 201*e*, phone 201*f*, location 201*g* and "reminder domain 202" includes set reminder 202*a*, subject 202*b* respectively. In such a scenario, the intent performing order is chosen randomly but not in sequence.

Unlike the related art methods, the proposed method is for performing the command multiple times to determine multiple intents with respective entities related to intents. In such a scenario, the intents are prioritized to perform based on intent ranking to avoid performing the intent randomly.

Figure 3A:
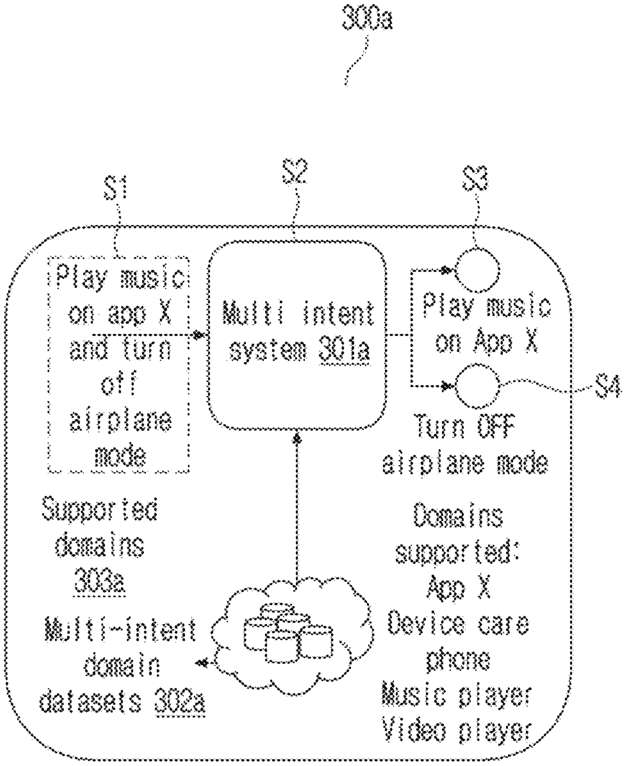
FIG. 3A (RELATED ART)
FIG. 3A is a schematic diagram illustrating a multi-intent system, according to the related art.
Figure 3B:
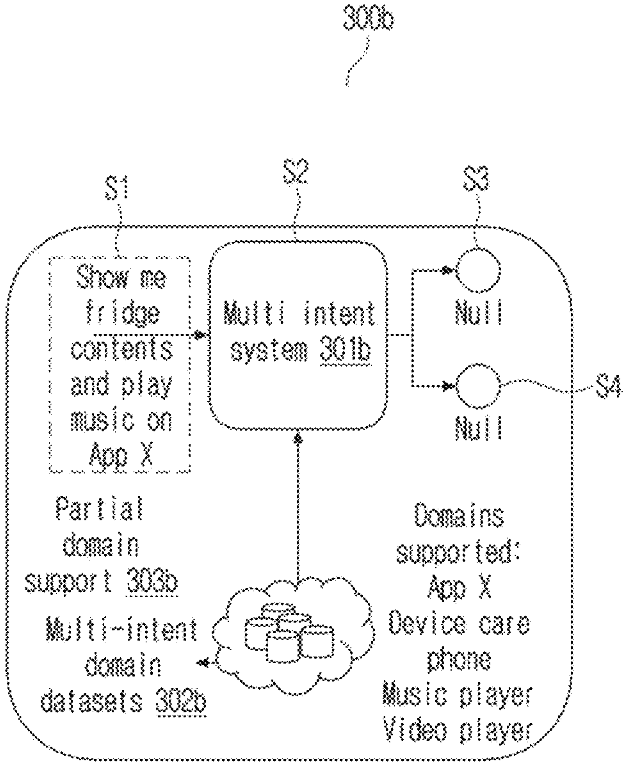
FIG. 3B (RELATED ART)
FIG. 3B is a schematic diagram illustrating a multi-intent system, according to the related art.

FIGS. 3A and 3B are schematic diagrams 300*a* and 300*b* illustrating a multi-intent system 301*a* and 301*b*, according to the related art as discussed herein.

In the related art methods, referring to FIGS. 3A and 3B, the multi-intent system 301*a* is usually resource intensive. As the number of domains increases, complex semantic coherence, the domain combinational explosion, and hence the increased dataset size/complexity, modelling complexity, higher latency, training resources, and hosting resources, in turn, add to complexity and cost. In the existing state of the art, when the out-of-domain commands are provided, the predictions are undesirable due to the limited domain scope of the multi-intent model. The multi-intent system 301*a* does not support the domain of first utterance in the multi-intent utterance and rejects the utterance as it was not from one of the supported domains and also the second supported utterance gets rejected. Referring to FIGS. 3A, at S1, the user providing a voice input to the multi-intent system 301*a*. For example, the voice input is like "Play music on app X and turn off airplane mode". At S2, the multi-intent system 301*a* determines the intent and domain of the intent within voice input. At S3, the multi-intent system 301*a* start playing the music on App X and turn of the airplane mode as represented in S4. Similarly, FIG. 3B is a partial domain support 303*b*, at S1, the user providing a voice input to the multi-intent system 301B. For example, the voice input is like "Show me fridge contents and play music on App X". At S2, the multi-intent system 301B determines the intent and domain of the intent within voice input. Here the multi-intent system 301*b* supports only App X domain but the multi-intent system 301*b* does not support the domain related to "shown me fridge contents". In such a scenario, both intents will not be performed by the multi-intent system 301*b*. The multi-intent domain datasets 302*a* and 302*b* of the FIGS. 3A and 3B are used to train the determined intent and slots to predict the next intent in the next voice input.

Unlike the related art methods, the proposed system is an extension to the single intent system that supports voice input with no additional resource complexities as existing multi-intent systems with lesser data, modelling complexity, the latency for prediction and results is enhanced, and better coverage of domains and user experience. In the proposed method, when the voice assistant device partially supports the domain, at least the voice assistant device performs an operation related to an intent which is related to the supported domains.

Figure 4:
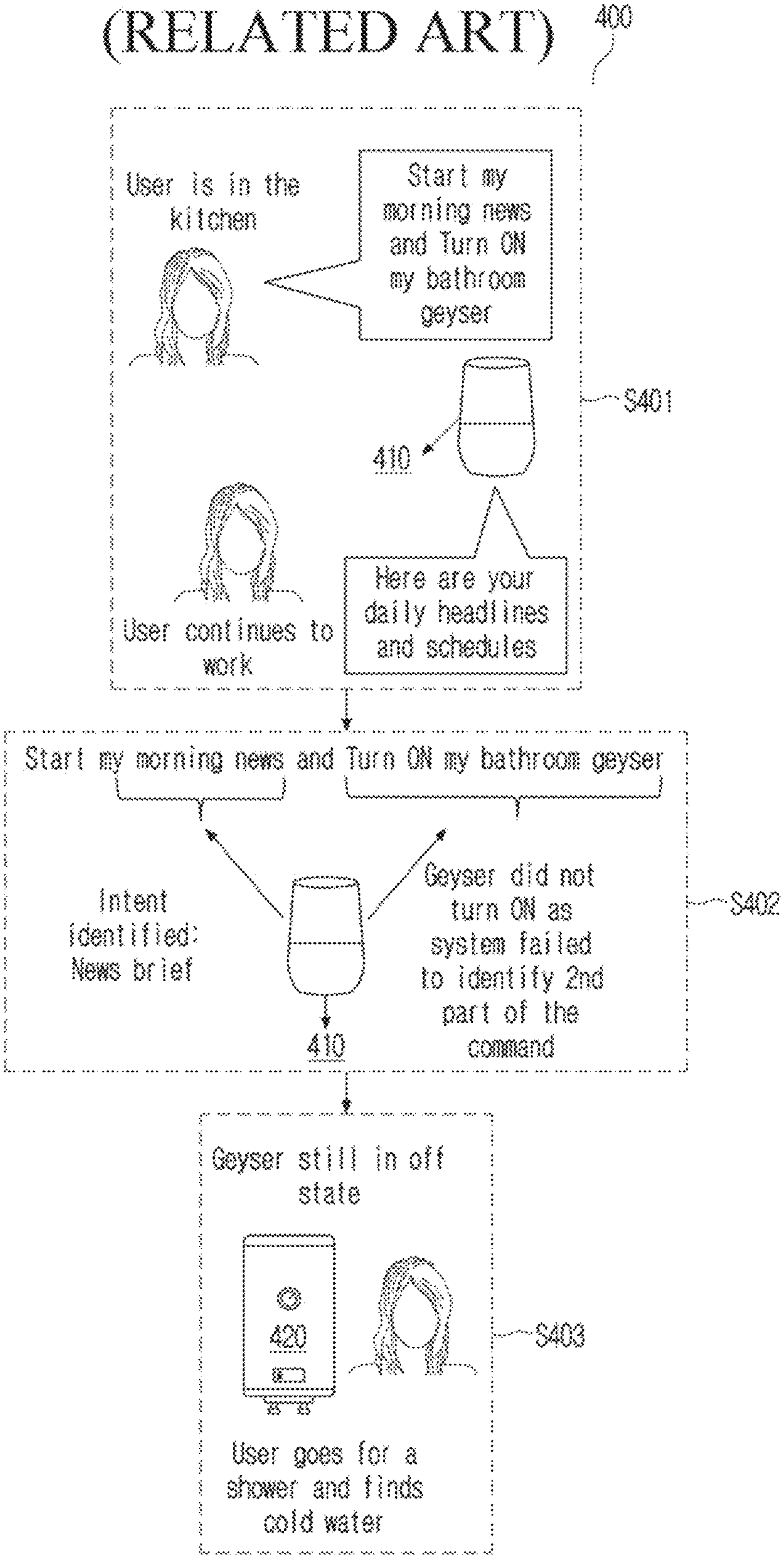
FIG. 4 (RELATED ART)
FIG. 4 is a schematic diagram illustrating a single intent system, according to the related art.

FIG. 4 is a schematic diagram 400 illustrating the single intent system, according to the related art as discussed herein.

In related art methods, referring to FIG. 4, for example, at S401, when the existing voice assistance device 410 receives the input command like "Start my morning news and Turn ON my bathroom geyser" from the user. At 402, the existing voice assistance device 410 determines the intent "morning news" and performs the determined intent by announcing the morning news via a speaker of the existing voice assistance device 410. Similarly, the existing voice assistance device 410 ignores the other command "Turn ON my bathroom geyser". So that the geyser 420 is still off-state that is represented in S403. In such a scenario, the user has to repeat the command "Turn ON my bathroom geyser" again to the existing voice assistance device 410 to perform the task which leads to limiting efficiency, time-consuming, and frustrating for the users to deal with multiple tasks at a time.

Unlike the related art methods, once the user gives the input voice command like "Start my morning news and Turn ON my bathroom geyser", the proposed method performs both intents like start playing the "morning news" and sending the command to the geyser via Internet of Things (IoT) to perform the command "Turn ON my bathroom geyser". As a result, multi-intent is performed at a time to avoid discomfort to the users.

Figure 5:
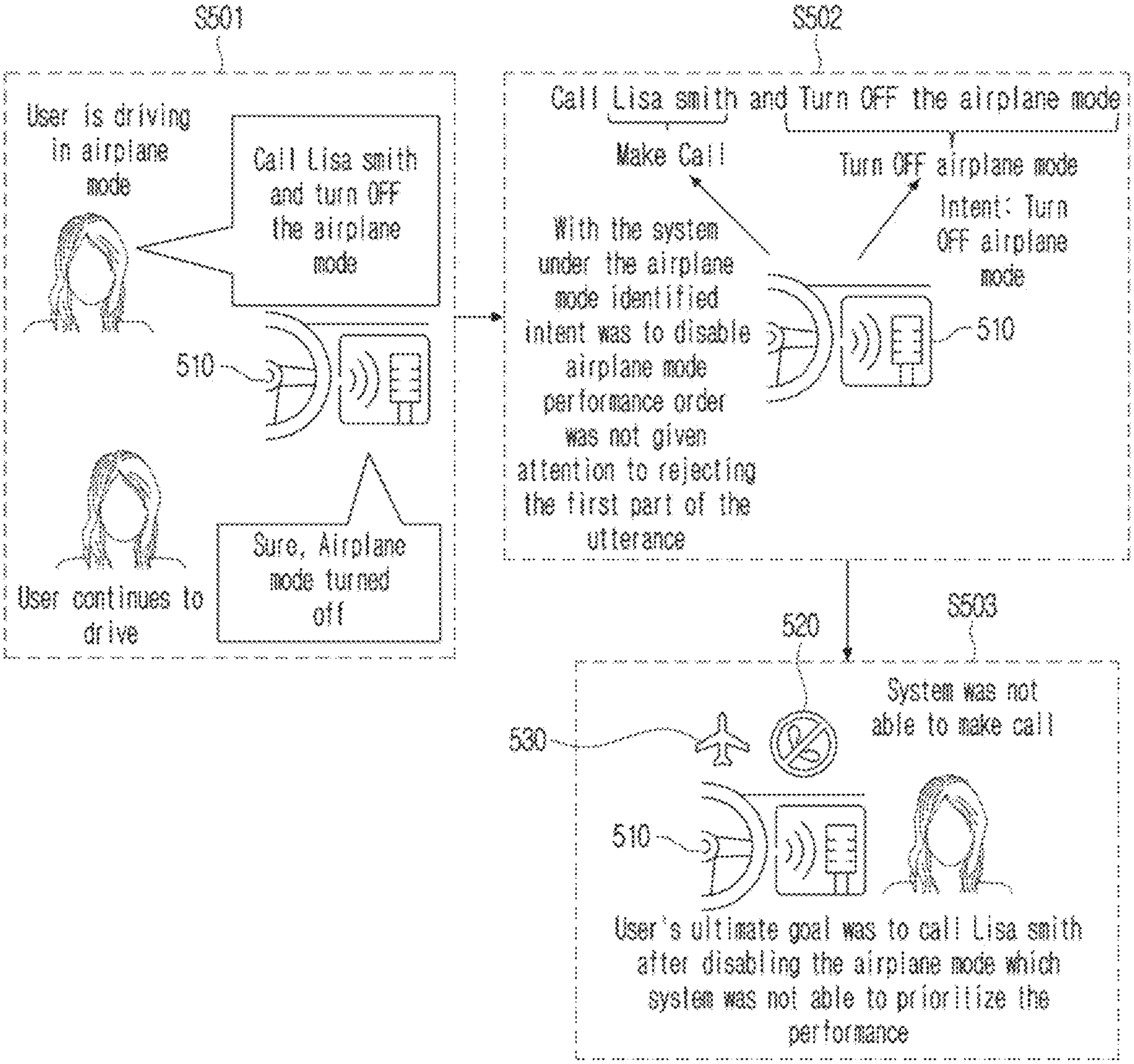
FIG. 5 (RELATED ART)
FIG. 5 is a schematic diagram illustrating a first scenario of the multi-intent system, according to the related art.

FIG. 5 is a schematic diagram illustrating a first scenario of the multi-intent system, according to the related art as discussed herein.

In related art methods, referring to FIG. 5, for example at S501, the user gives the input voice command to the existing voice assistant device 510, when the user is driving a car in airplane mode. Here, the voice input is like "Call Lisa Smith and turn OFF the airplane mode". At S502, once the existing voice assistant device 510 receives the voice input from the user, the existing voice assistant device 510 performs an operation based on the intent by turning OFF the airplane mode 530 but the existing voice assistant device 510 ignores the other intent 520 "Call Lisa smith". In such a scenario, the user's goal is to "call Lisa Smith" 520 after disabling the airplane mode 530, but the existing voice assistant device 510 is not able to prioritize the performance that is represented in S503.

Unlike the related art methods, once the user gives the input voice command like "Call Lisa Smith and turn OFF the airplane mode", the proposed method performs operations based on both intents like turning OFF the airplane mode and calling Lisa Smith. As a result, the multi-intent is performed at a time to avoid the users to deviate from driving the car.

Figure 6:
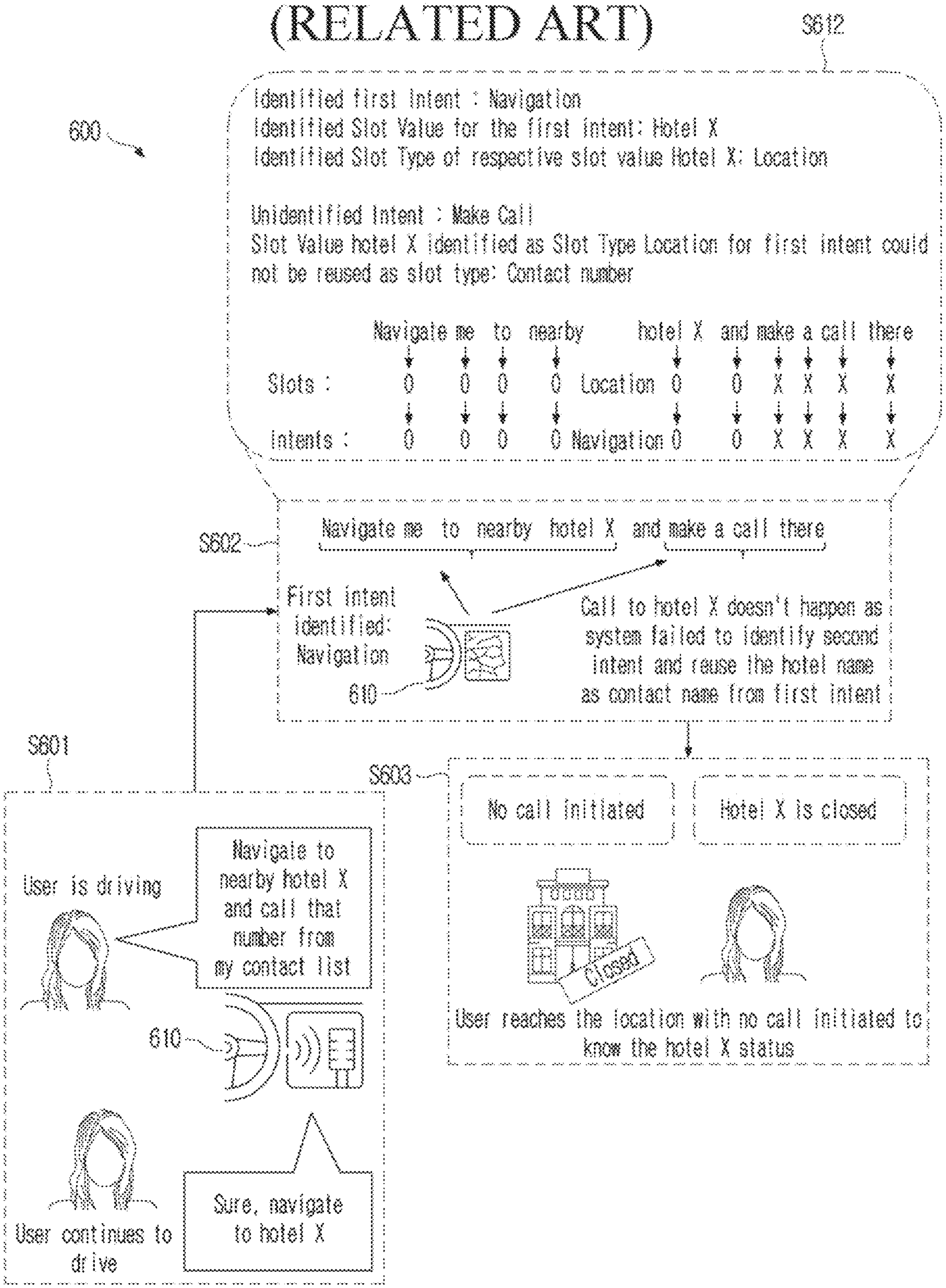
FIG. 6 (RELATED ART)
FIG. 6 is a schematic diagram illustrating a second scenario of the multi-intent system, according to the related art.

FIG. 6 is a schematic diagram 600 illustrating a second scenario of the multi-intent system, according to the related art as discussed herein.

In related art methods, referring to FIG. 6, for example, at S601, the user gives the input voice command to the existing voice assistant device 610, when the user driving the car. The voice input is like "Navigate me to nearby Hotel X and make a call there". At S602, once the existing voice assistant device 610 receives the voice input from the user, the existing voice assistant device 610 classifies the intent and the slot value for the intent from the received voice input that is represented as "O". The existing voice assistant device 610 identifies the first intent as "Navigation", identifies the slot value for the first intent as "Hotel X", and identifies the slot type of respective slot value Hotel X as "Location". Once the existing voice assistant device 610 identifies the first intent and slot from the received voice input, the existing voice assistant device 610 navigates to the location of Hotel X which is displayed on the display of the existing voice assistant device 610. Similarly, the existing voice assistant device 610 has to perform an operation based on the other intent "make a call there", but the existing voice assistant device 610 fails to identify the second intent from the received voice input that is represented as "X". The existing voice assistant device 610 not making a call to Hotel X due to not identifying the second intent and not reusing the hotel name as the contact name from the first intent is represented in the S612. In such a scenario, the user does not know the status of Hotel X whether Hotel X is open or closed due to not making a call to Hotel X as represented in S603.

Unlike the related art methods, once the user gives the input voice command such as "Navigate to nearby Hotel X and call that number from my contact list", the proposed method performs operations based on both intents like navigating to nearby Hotel X and calling Hotel X from the contact list. As a result, the proposed method identifies the second intent from the received voice input and makes a call to Hotel X by reusing the hotel name as the contact name from the first intent. In such a scenario, the user makes the call to hotel X to know the status of Hotel X.

Figure 7:
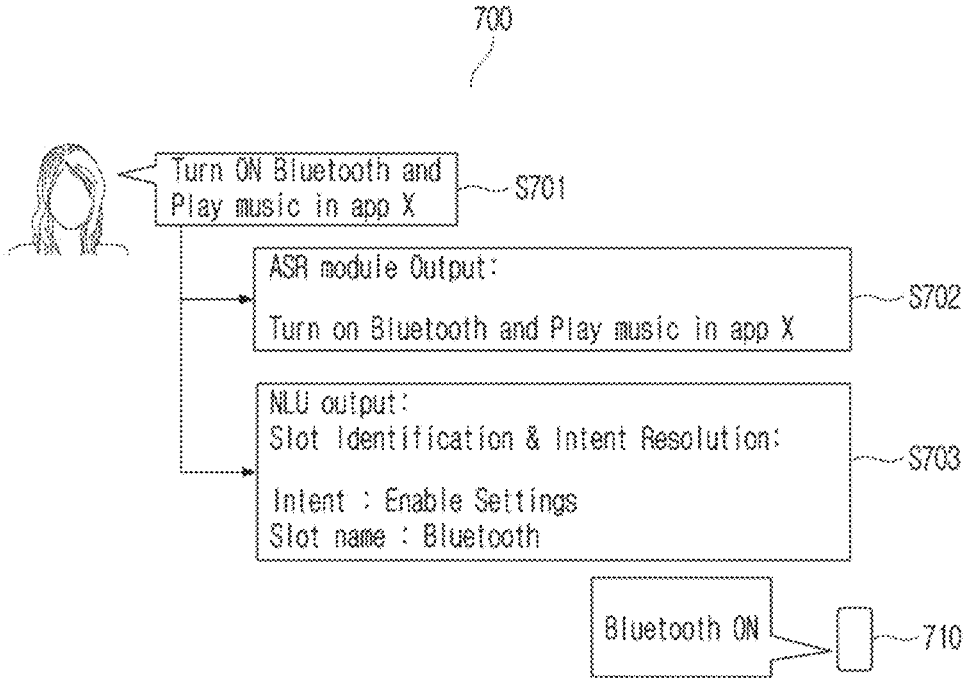
FIG. 7 (RELATED ART)
FIG. 7 is a schematic diagram illustrating a third scenario of the multi-intent system, according to the related art.

FIG. 7 is a schematic diagram 700 illustrating a third scenario of the multi-intent system, according to the related art as discussed herein.

In the related art methods, referring to FIG. 7, for example, at S701, the user gives the voice input to the existing voice assistant device 710. The voice input can be "Turn ON Bluetooth and Play music in app X". At S702, an automatic speech recognition (ASR) module sends the voice input to the natural Language Unit (NLU) of the existing voice assistant device 710 to identify the intent and slot of the intent. Here, the intent is "enable setting" and the slot is "Bluetooth S703". So, Bluetooth is enabled in the existing voice assistant device 710, but the existing voice assistant device 710 fails to play the music in app X which leads to inconvenience for the user to give another voice input for "Play music in app X" to the existing voice assistant device 710.

Unlike the related art methods, once the user gives the input voice command can be "Turn ON Bluetooth and Play music in app X", the proposed method performs operations based on both intents turning ON Bluetooth and playing music in app X. As a result, the proposed method performs operations based on the multi-intent at the same time to avoid the inconvenience to the user.

The terms "voice input" and "voice command" are used interchangeably throughout the specification.

Referring now to the drawings and more particularly to FIGS. 8 through 27, where similar reference characters denote corresponding features consistently throughout the figures.

Figure 8:
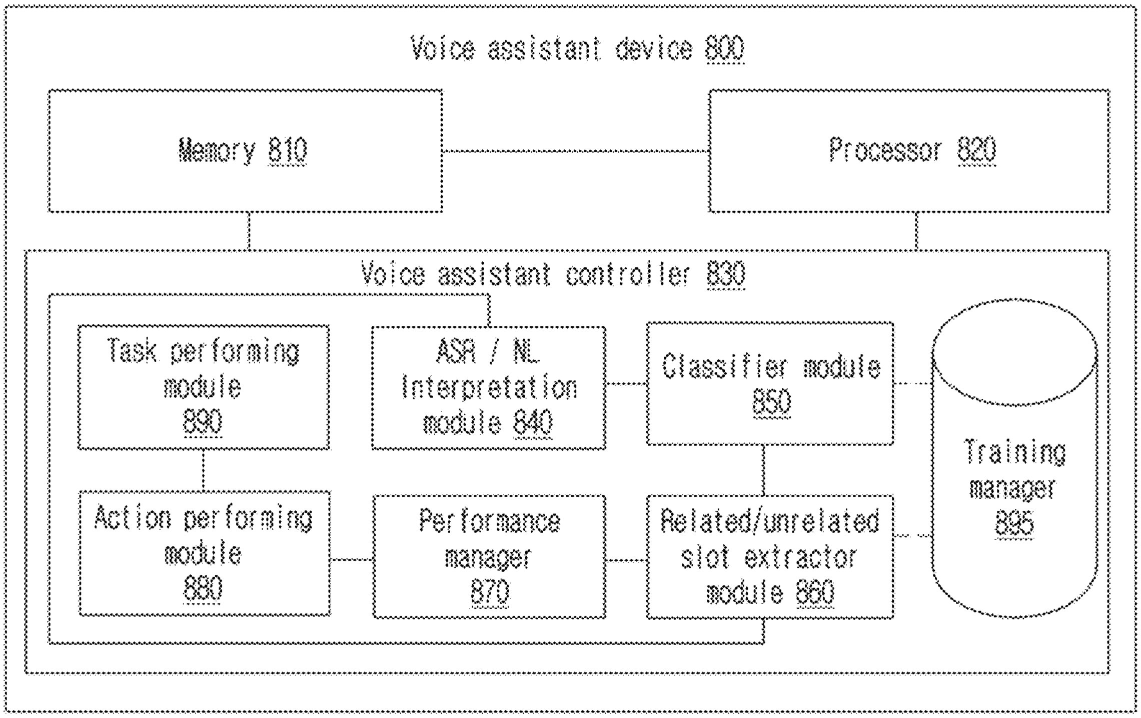
FIG. 8 is a block diagram of a voice assistant device for handling voice input, according to an embodiment.

FIG. 8 is a block diagram of a voice assistant device 800, according to an embodiment.

The voice assistant device 800 includes a memory 810, a processor 820 coupled to the memory 810, and a voice assistant controller 830 communicatively coupled to the processor 820 and the memory 810. The voice assistant controller 830 receives a voice input from a user of the voice assistant device 800. Further, the voice assistant controller 830 determines a first user intent and a plurality of slots from received voice input. The plurality of slots can be a slot related to the first user intent and a slot unrelated to the first user intent. Also, the voice assistant controller 830 determines a second user intent from received voice input based on the slot unrelated to the first user intent and performs operations based on the first user intent and the second user intent.

The memory 810 is configured to store instructions to be performed by the processor 820. The memory 810 includes non-volatile storage elements. Examples of such non-volatile storage elements includes magnetic hard discs, optical discs, floppy discs, flash memories, or forms of Electrically Programmable Memories (EPROM) or Electrically Erasable and Programmable Memories (EEPROM). In addition, the memory 810 in some examples, be considered a non-transitory storage medium. The term "non-transitory" indicates that the storage medium is not embodied in a carrier wave or a propagated signal. The term "non-transitory" is not be interpreted that the memory 810 is non-movable. In some examples, the memory 810 is configured to store larger amounts of information. In certain examples, a non-transitory storage medium stores data that can, over time, change (e.g., in Random Access Memory (RAM) or cache).

The processor 820 includes one or a plurality of processors. The one or the plurality of processors is a general-purpose processor, such as a central processing unit (CPU), an application processor (AP), or the like, a graphics processing unit such as a graphics processing unit (GPU), a Visual Processing Unit (VPU), and/or an AI-dedicated processor such as a neural processing unit (NPU). The processor 820 includes multiple cores and is configured to perform the instructions stored in the memory 810.

In an embodiment, the voice assistant controller 830 includes an ASR/NL interpretation module 840, a classifier module 850, a related/unrelated slot extractor module 860, a performance manager 870, and a training manager 895. The automatic speech recognition (ASR)/natural language (NL) interpretation module 840 receives the voice input from the user and sends the voice input to the classifier module 850. The classifier module 850 determines the first user intent and the plurality of slots from the received voice input and sends the determined information to the related/unrelated slot extractor module 860 to determine the second user intent from the received voice input based on the slot unrelated to the first user intent. The related/unrelated slot extractor module 860 sends the first user intent to the performance manager 870 to perform an operation based on the first user intent (i.e., a first user intent task) and simultaneously, the related/unrelated slot extractor module 860 checks whether the slot unrelated to the first user intent is available or not. When the slot unrelated to the first user intent is available, the related/unrelated slot extractor module 860 sends the slot unrelated to the first user intent to the ASR/NL interpretation module 840 as an input to repeat the same operation performed for the first user intent.

Once the performance manager 870 receives the second user intent, the performance manager 870 sends the first user intent and the second user intent to the action performing module 880. The action performing module 880 determines a correlation between the first user intent and the second user intent to determine an order for performing operations based on the first user intent and the second user intent. The action performing module 880 performs operations based on the first user intent and the second user intent based on the order. The training manager 895 trains the determined first user intent, second user intent and the plurality of slots to predict the next user intent and the next plurality of slots in the next voice input. In an embodiment, the classifier module 850 of the voice assistant controller 830 determines a domain from the voice input.

In an embodiment, the related/unrelated slot extractor module 860 of the voice assistant controller 830 determines whether the slot unrelated to the first user intent is available or not. When the slot unrelated to the first user intent is available, the related/unrelated slot extractor module 860 sends the second user intent to the performance manager 870 to perform a task or operation based on the second user intent. When a slot unrelated to the first user intent is not available, the related/unrelated slot extractor module 860 halts the second user intent.

The voice assistant controller 830 may be implemented by processing circuitry such as logic gates, integrated circuits, microprocessors, microcontrollers, memory circuits, passive electronic components, active electronic components, optical components, hardwired circuits, or the like, and optionally be driven by firmware. The circuits for example, be embodied in one or more semiconductor chips, or on substrate supports such as printed circuit boards and the like.

At least one of the plurality of modules/components of the voice assistant controller 830 can be implemented through an artificial intelligence (AI) model. A function associated with the AI model that is performed through the memory 810 and the processor 820. The processors control the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning is performed in a device itself in which AI according to an embodiment is performed, and/or is implemented through a separate server/system.

The AI model includes neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), Deep Belief Network (DBN), bidirectional recurrent deep neural network (BRDNN), Generative Adversarial Networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the voice assistant device 800 is not limited to a smartphone, a laptop or desktop computer, a tablet computer, a voice command device, a mobile device, or an in-vehicle system that includes an audio input device for example, microphone and an audio output device for example, speakers, headphones. In some implementations, the voice assistant device 800, such as a voice command device, a mobile device, or the in-vehicle system, is communicatively coupled to the smartphone, a tablet device, and the like. The voice assistant device 800 includes an application or module, for example, a voice command device settings application that facilitates the configuration of the voice assistant device 800 including voice assistant features.

Figure 9A:
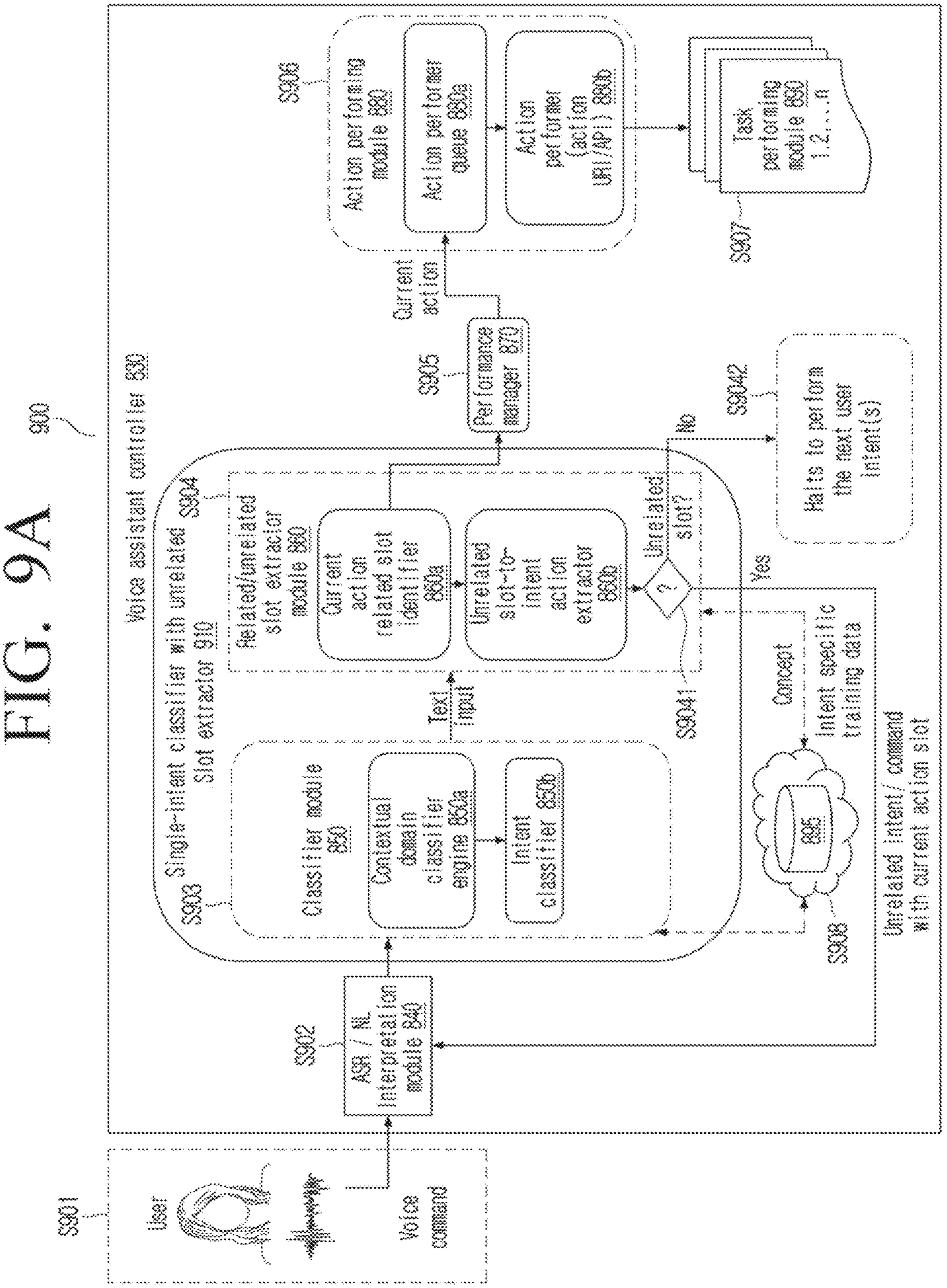
FIG. 9A is a schematic diagram illustrating a voice assistant controller for handling voice input, according to an embodiment.

FIG. 9A is a schematic diagram 900 illustrating a voice assistant controller 830, according to an embodiment.

In an embodiment, at S901, the user provides the voice command to the voice assistant device 800. At S902, the ASR/NL interpretation module 840 of the voice assistant controller 830 receives the voice input from the user. The ASR/NL interpretation module 840 converts the voice input into the text format and sends the text input to the single-intent classifier with the unrelated slot extractor 910 that includes the classifier module 850 and a related/unrelated slot extractor module 860. At S903, the classifier module 850 includes a contextual domain classifier engine 850*a* and an intent classifier 850*b*. The contextual domain classifier engine 850*a* determines the domain from the voice input. The intent classifier 850*b* determines the intent from the voice input. The classifier module 850 determines the domain and the intent of the voice input. At S904, the related/unrelated slot extractor module 860 includes a current action related slot identifier 860*a* and an unrelated slot-to-intent action extractor 860*b*. The current action related slot identifier 860*a* extracts the first user intent and the slot related to the first user intent. The current action related slot identifier 860*a* sends the first user intent and the slot related to the first user intent to the performance manager 870.

Simultaneously, the unrelated slot-to-intent action extractor 860*b* checks whether the slots unrelated to the first user intent is available or not S9041. When the slots unrelated to the first user intent is available, the unrelated slot-to-intent action extractor 860*b* sends the slots unrelated to the first user intent to the ASR/NL interpretation module 840. The ASR/NL interpretation module 840 sends the slots unrelated to the first user intent to the classifier module 850. The contextual domain classifier engine 850*a* determines the domain from received slots unrelated to the first user intent. The intent classifier 850*b* determines the intent from the slots unrelated to the first user intent. The classifier module 850 determines the domain and the intent of the slots unrelated to the first user intent. The current action related slot identifier 860*a* extracts the second user intent and the slot related to the second user intent. After that, the current action related slot identifier 860*a* sends the second user intent and the slot related to the second user intent to the performance manager 870.

Simultaneously, the unrelated slot-to-intent action extractor 860*b* checks whether the slots unrelated to the second user intent is available or not. At S9042, when the slots unrelated to the second user intent is not available, the unrelated slot-to-intent action extractor 860*b* halts performance of operations based on the next user intents. Similarly, when the slots unrelated to the first user intent is not available, the unrelated slot-to-intent action extractor 860*b* halt the performance of an operation based on the second user intent.

At S905, once the performance manager 870 receives the first user intent and the second user intent from the current action related slot identifier 860*a*, the performance manager 870 sends the first intent and the second user intent to the action performing module 880 that determines the correlation between first user intent and the second user intent. At S906, the action performing module 880 includes an action performer queue 880*a* and an action performer 880*b*. The action performer queue 880*a* determines the order for performing operations based on the first user intent and the second user intent based on the correlation and sends the determined order to the action performer 880*b* that has capabilities to perform the task based on the application requirement. The action performer 880*b* sends the prioritized order to the task performing module 890 to perform the task based on received voice input from the user. At S907, the task performing module 890 performs the tasks based on the first user intent and the second user intent in the determined order.

At S908, the training manager 895 trains the determined first user intent, second user intent and the plurality of slots to predict the next user intent and the next plurality of slots in the next voice input.

Figure 9B:
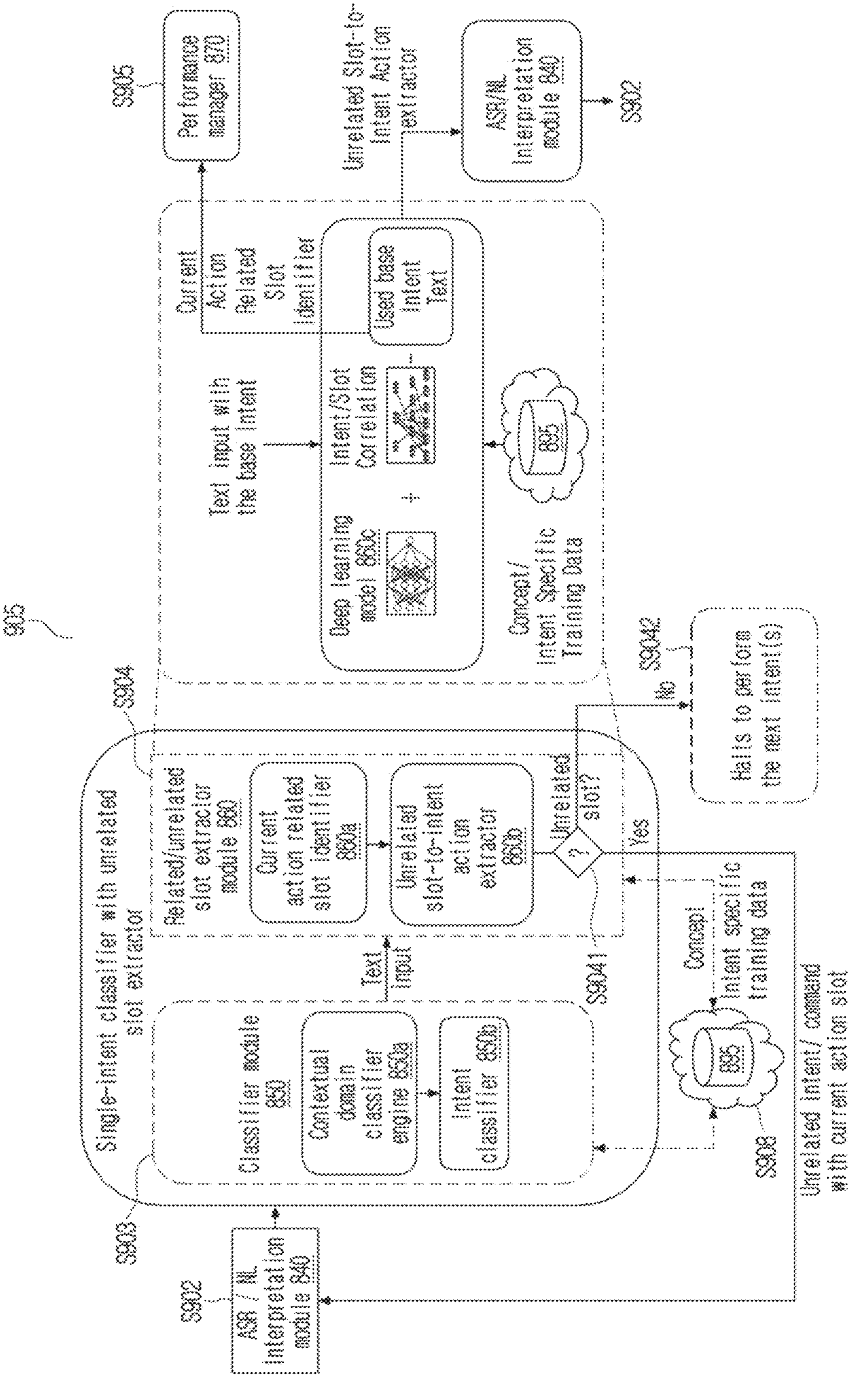
FIG. 9B is a schematic diagram illustrating a deep learning model of the related/unrelated slot extractor module, according to an embodiment.

FIG. 9B is a schematic diagram 905220 illustrating a deep learning model 860C of the related/unrelated slot extractor module 860, according to an embodiment.

The related/unrelated slot extractor module 860 uses single intent training data and intent-slot concepts and correlation+neural model to determine the unrelated slot for the identified first user intent.

The unrelated slot-to-Intent action extractor 860*b* passes unrelated slot information using defined standard way of delivering data. Once the data is received at ASL/NL interpretation module 840, check for source of the data is done. When the source is "user", the data is fed first to the ASR module of the ASR/NL interpretation module 840 or the data is directly fed to the NL interpreter module to perform further.

The unrelated slot-to-intent action extractor 860*b* is to only identify whether there is any unrelated slot exists or not. The validation part is done at the classifier module 850 once unrelated slot passed to classifier module 850 in a standard way. To determine the domain of text command, the contextual domain classifier engine 850*a* validates the linguistic correctness of the received text. When the text is not valid, invalid domain is detected and perform gets halted using invalid/unsupported domain handling.

The contextual domain classifier engine 850*a* identifies the domain by determining the characteristics of texts using state of art LM. Once domain is identified, determination of intent is narrowed down to limited number of intents from that domain and uses slot-correlation technique to use previous context slot information (slot unrelated to first user intent) to determine exact slot filling for the second user intent.

Figure 10A:
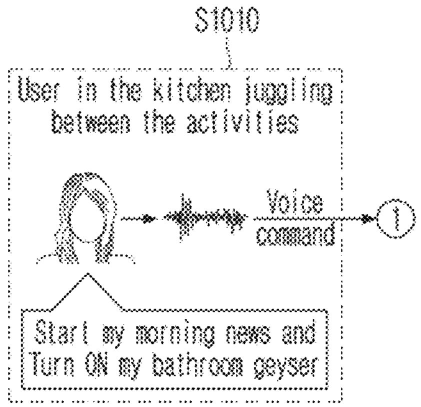
FIG. 10A is a schematic diagram illustrating a first scenario of a voice assistant controller for handling voice input, according to an embodiment.
Figure 10B:
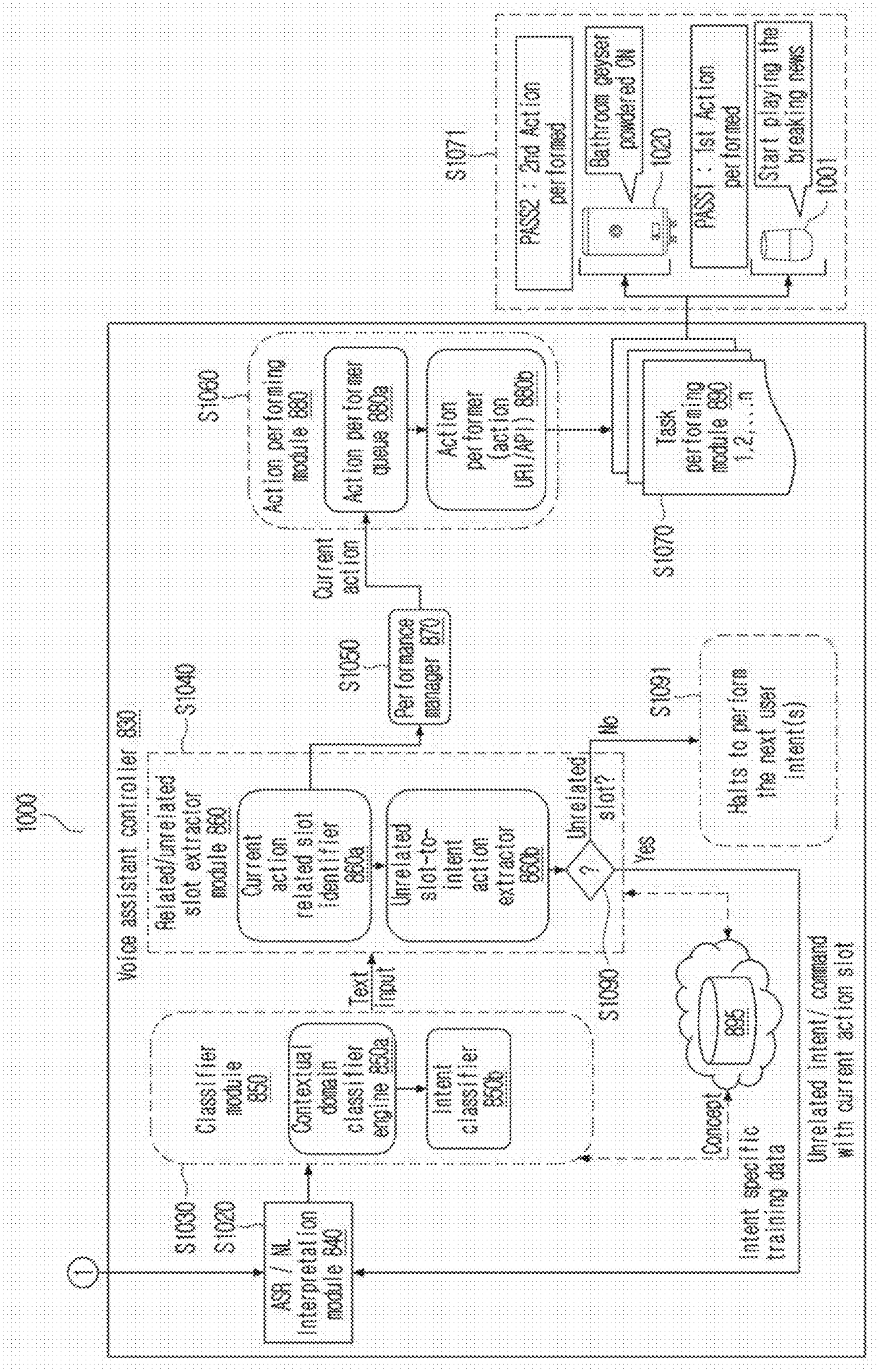
FIG. 10B is a schematic diagram illustrating a first scenario of a voice assistant controller for handling voice input, according to an embodiment.

FIG. 10A and FIG. 10B are schematic diagrams 1000 illustrating a first scenario of a voice assistant controller 830 for handling voice input, according to an embodiment.

For example, at S1010, when the user juggles between the activities in the kitchen, the user has to hear the morning news and turn ON the bathroom geyser. So, the user gives voice commands including voice input like “Start my morning news and Turn ON my bathroom geyser” to the voice assistant device 800. At S1020, the ASR/NL interpretation module 840 of the voice assistant controller 830 receives the voice command from the user and converts the voice command into machine-readable text format and sends to the classifier module 850. At S1030, the intent classifier 850*b* of the classifier module 850 determines the first user intent from the received voice command. For example, the intent classifier 850*b* determines the “start news” as the first user intent from the received voice command as shown in Table 1. The contextual domain classifier engine 850*a* determines the domain of the received voice command from the user. For example, the contextual domain classifier engine 850*a* determines the “news” as the domain from the received voice input. The classifier module 850 sends the determined first user intent, domain of the first user intent and voice command as the text input to the related/unrelated slot extractor module 860.

TABLE 1

| Voice command | First user intent |
|---|---|
| Start my morning news and turn on my bathroom geyser | Start News |

At S1040, the related/unrelated slot extractor module 860 receives the first user intent and voice command as the text input and segregates the first user intent, a plurality of slots related to the first user intent, and the slots unrelated to the first user intent. For example, from the received voice command “Start my morning news and Turn ON my bathroom geyser”, the related/unrelated slot extractor module 860 segregates the first user intent as “start news”, the slots related to the first user intent as “morning news” and the slots unrelated to the first user intent as “Turn on my bathroom geyser” as shown in Table 2. The current action related slot identifier 860*a* of the related/unrelated slot extractor module 860 determines the first user intent as “start news” and the slots related to the first user intent as “morning news”.

TABLE 2

| Voice command | First user Intent | Slots Identified for First user Intent | Additional Slot for first user intent | Slots unrelated to first user intent |
|---|---|---|---|---|
| Start my morning news and turn on my bathroom geyser | Start News | Slot Type: news Type slot Value: Morning News | Null | Turn on my bathroom geyser |

Further, at S1040, the unrelated slot-to-intent action extractor 860*b* of the related/unrelated slot extractor module 860 determines whether the slots unrelated to the first user intent is available. For example, the unrelated slot-to-intent action extractor 806*b* determines the “Turn on my bathroom geyser” as the slots unrelated to the first user intent. The unrelated slot-to-intent action extractor 860*b* sends the slots unrelated to the first user intent and the slots related to the first user intent (“morning news” as an input to the ASR/NL interpretation module 840 which transfers the received input to the classifier module 850 for determining the second user intent and the domain of the second user intent. For example, the intent classifier 850*b* determines the “turn ON IoT device” as second user intent as shown in Table 3. The contextual domain classifier engine 850*a* determines the domain of the received voice command from the user. For example, the contextual domain classifier engine 850*a* determines the “IoT” as the domain from the received second user intent. The classifier module 850 sends the determined second user intent, domain, and the voice command as the text input to the related/unrelated slot extractor module 860.

TABLE 3

| Voice command | Second user intent |
|---|---|
| Turn ON my bathroom geyser | Turn ON IoT Device |

Further, at S1040, the current action related slot identifier 860*a* of the related/unrelated slot extractor module 860 determines the second user intent as the current intent and transfers the second user intent to the performance manager 870. The unrelated slot-to-intent action extractor 860*b* of the related/unrelated slot extractor module 860 checks whether the slot unrelated to the second user intent is available or not S1090. When the slot unrelated to the second user intent is available, the voice assistant controller determines the next user intent by repeating the same procedures which are used to determine the first user intent and the second user intent. At S1091, when the slot unrelated to the second user intent is not available, the unrelated slot-to-intent action extractor 860*b* of the related/unrelated slot extractor module 860 halts to perform an operation based on the next user intent as represented in S1091. For example, the related/unrelated slot extractor module 860 determines the second user intent as “Turn ON IoT device”, the slots related to the second user intent as “bathroom geyser”, the additional slot for second user intent as “morning news” and unrelated slot of the second user intent is “NULL” from the voice command of “Turn ON bathroom geyser” as shown in Table 4. When the unrelated slot of the second user intent is available, the unrelated slot-to-intent action extractor 860*b* of the related/unrelated slot extractor module 860 determines the next user intent and send the next user intent to the performance manager 870.

TABLE 4

| Voice command | Second user Intent | Slots Identified for second user Intent | Additional Slot for second user Intent | Unrelated Slot of the second user intent |
|---|---|---|---|---|
| Turn ON my bathroom geyser | Turn ON IoT Device | Slot Type: device Name slot Value: bathroom geyser | Morning News | NULL |

At S1050, once the performance manager 870 receives the first user intent, the performance manager 870 sends an operation based on the first user intent as the current action to the action performing module 880. Similarly, once the performance manager 870 receives the second user intent, the performance manager 870 sends the second user intent as the current action to the action performing module 880. At S1060, the action performing module 880 creates the plan to perform operations based on the first user intent and the second user intent as shown in Tables 5 and 6. The action performer queue 880*a* of the action performing module 880 prioritize the order of the first user intent and the second user intent in the queue to be performed. For example, the action performer queue 880*a* prioritizes the order of "Start my morning news" and "Turn on my bathroom geyser" to be performed. The action performer 880*b* of the action performing module 880 sends a performance command to the task performing module 890 which sends the task command via Application Programming Interface (API)/Uniform Resource Identifier (URI) to radio or speaker to start playing the morning news and similarly, at S1070, the task performing module 890 sends the task command to IoT device for turning ON the bathroom geyser. Referring to FIGS. 10A and 10B, the first user intent of "morning news" is performed in speaker 1001 and the second user intent of "turn ON bathroom geyser" is performed by powered ON the bathroom geyser 1020 as represented in S1071.

TABLE 5

| Voice command | First user intent |
|---|---|
| Start my morning news | Playing news in news domain with "morning news" as slot value |

TABLE 6

| Voice command | First user intent |
|---|---|
| Turn on my bathroom geyser | Turn ON bathroom geyser from IoT domain with "bathroom geyser" as slot |

Figure 10C:
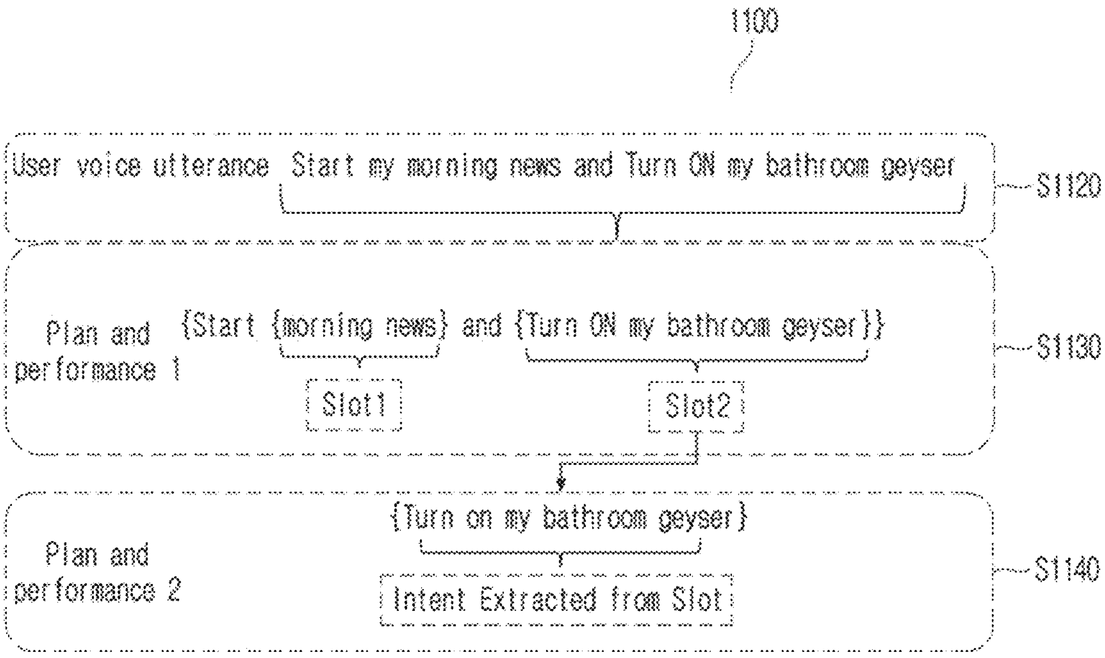
FIG. 10C is a schematic diagram illustrating a method of performing voice input with respect to the first scenario of the voice assistant controller, according to an embodiment.

FIG. 10C is a schematic diagram 1100 illustrating a method to perform operations corresponding to a voice input with respect to the first scenario of the voice assistant controller 830, according to an embodiment.

At S1120, the method includes receiving the voice command from the user as "Start my morning news and Turn ON my bathroom geyser".

At S1130, the method includes determining the slot 1 as "morning news" of the first user intent and performing the slot 1 by playing the morning news. Similarly, the method includes determining the slot 2 as "Turn ON my bathroom geyser".

At S1140, the method includes extracting the second user intent from the slot 2 and performing the slot 2 by turning ON the bathroom geyser.

Figure 11A:
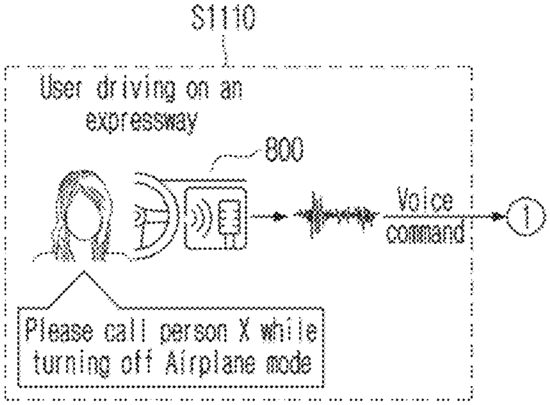
FIG. 11A is a schematic diagram illustrating a second scenario of the voice assistant controller for handling voice input, according to an embodiment.
Figure 11B:
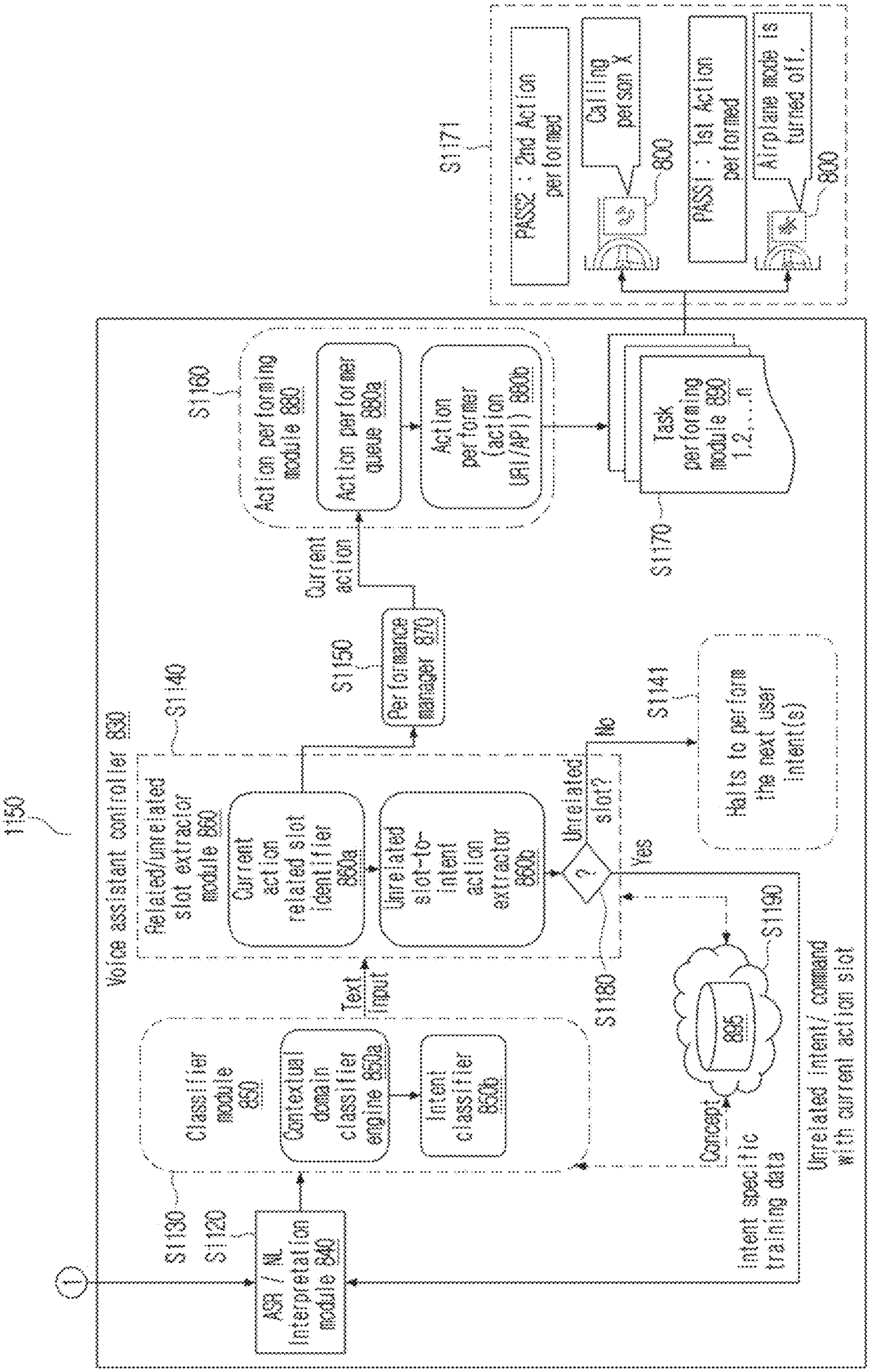
FIG. 11B is a schematic diagram illustrating a second scenario of the voice assistant controller for handling voice input, according to an embodiment.

FIG. 11A and FIG. 11B are schematic diagrams 1150 illustrating a second scenario of the voice assistant controller 830 for handling voice input, according to an embodiment.

For example, at S1110, when the user is driving on an expressway, the user has to call a person X from the user contact list while turning OFF airplane mode. So, the user gives voice commands including voice input like "Please call person X while turning off airplane mode" to the voice assistant device 800. At S1120, the ASR/NL interpretation module 840 of the voice assistant controller 830 receives the voice command from the user and sends to the classifier module 850. The intent classifier 850*b* determines the first user intent from the received voice command. In such a scenario, the voice assistant device 800 determines that making a call to person X after tuning OFF the airplane mode. So, the voice assistant device 800 determines the first user intent as "Turing OFF the airplane mode" from the received voice command as shown in Table 7. The contextual domain classifier engine 850*a* determines the domain of the received voice command from the user. For example, the contextual domain classifier engine 850*a* determines the "news" as the domain from the received voice input. The classifier module 850 sends the determined first user intent, domain of the first user intent and voice command as the text input to the related/unrelated slot extractor module 860.

TABLE 7

| Voice command | First user intent |
|---|---|
| Please call person X while turning off Airplane mode | Turn OFF Airplane Mode |

At S1140, the related/unrelated slot extractor module 860 segregates the first user intent as "Turn OFF airplane mode", the slots related to the first user intent as "airplane mode" and the slots unrelated to the first user intent as "please call person X" as shown in Table 8. The current action related slot identifier 860*a* of the related/unrelated slot extractor module 860 determines the first user intent as "Turn OFF airplane mode" and the slots related to the first user intent as "airplane mode".

TABLE 8

| Voice command | First user Intent | Slots Identified for First user Intent | Additional Slot for first user intent | slots unrelated to first user intent |
|---|---|---|---|---|
| Turn off Airplane mode | Turn OFF Airplane Mode | Slot Type: Disable Settings Slot Value: Airplane mode | Null | Please Call person X |

Further, at S1140, the unrelated slot-to-intent action extractor 860*b* of the related/unrelated slot extractor module 860 determines whether the slots unrelated to the first user intent is available. For example, the unrelated slot-to-intent action extractor 860*b* determines the "please call person X" as the slots unrelated to the first user intent. The unrelated slot-to-intent action extractor 860*b* sends the slots unrelated to the first user intent and the slots related to the first user intent ("airplane mode") as an input to the ASR/NL interpretation module 840 which transfers the received input to the classifier module 850 for determining the second user intent and the domain of the second user intent. For example, the intent classifier 850*b* determines the "turn ON IoT device" as second user intent as shown in Table 9. The contextual domain classifier engine 850*a* determines the domain of the received voice command from the user. For example, the contextual domain classifier engine 850*a* determines the "intelligent things" as the domain from the received second user intent. The classifier module 850 sends the determined second user intent, domain, and the voice command as the text input to the related/unrelated slot extractor module 860.

TABLE 9

| Voice command | Second user intent |
| --- | --- |
| Please Call person X | Make call |

The current action related slot identifier 860*a* of the related/unrelated slot extractor module 860 determines the second user intent as the current intent and transfers the second user intent to the performance manager 870. The unrelated slot-to-intent action extractor 860*b* of the related/unrelated slot extractor module 860 checks whether the slot unrelated to the second user intent is available or not as represented in S4. When the slot unrelated to the second user intent is available, the voice assistant controller determines the next user intent by repeating the same procedures (from S1120 to S1140) which are used to determine the first user intent and the second user intent. When the slot unrelated to the second user intent is not available, the unrelated slot-to-intent action extractor 860*b* of the related/unrelated slot extractor module 860 halts to perform an operation based on the next user intent as represented in S1141. For example, the related/unrelated slot extractor module 860 determines the second user intent as "make call", the slots related to the second user intent as "person X", the additional slot for second user intent as "NULL" and unrelated slot of the second user intent is "NULL" from the voice command of "Please Call person X" as shown in Table 10. When the unrelated slot of the second user intent is available, the unrelated slot-to-intent action extractor 860*b* of the related/unrelated slot extractor module 860 determines the next user intent and send the next user intent to the performance manager 870. At S1150, once the performance manager 870 receives the first user intent ("turn off airplane mode") and sends the first user intent as the current action to the action performing module 880. Similarly, once the performance manager 870 receives the second user intent (call person X) and sends the second user intent as the current action to the action performing module 880.

TABLE 10

| Voice command | Second user Intent | Slots Identified for second user Intent | Additional Slot for second user Intent | Unrelated Slot of the second user intent |
| --- | --- | --- | --- | --- |
| Please Call person X | Make Call | Slot Type: contact Name slot Value: person X | NULL | NULL |

At S1160, the action performing module 880 creates the plan to perform operations based on the first user intent and the second user intent as shown in Table 11 and 12. The action performer queue 880*a* of the action performing module 880 prioritize the order of the first user intent and the second user intent in the queue to be performed and sends the prioritized order to the task performing module 890. For example, the action performer queue 880*a* prioritizes the order of "turning OFF airplane mode" and "Please call person X" to be performed. At S1170, the task performing module 890 turns OFF the airplane mode and similarly, the task performing module 890 makes a call to person X. At S1171, the voice assistant device 800 turns OFF the airplane mode to complete the task of the first user intent before makes a call to person X from the user contact list to complete the task of the second user intent.

TABLE 11

| Voice command | First user intent |
| --- | --- |
| Turn off Airplane Mode | Turn On/Off Airplane Mode from Device settings Domain |

TABLE 12

| Voice command | First user intent |
| --- | --- |
| Please Call person X | Make Call from Phone App domain with "person X" as contact name slot" |

Figure 11C:
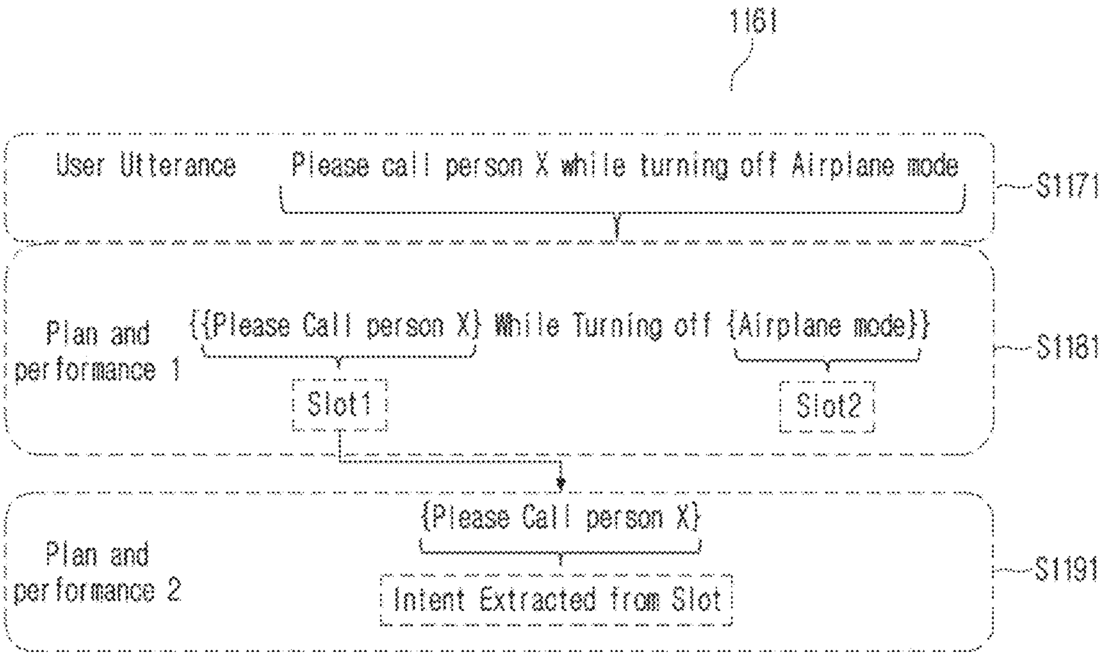
FIG. 11C is a schematic diagram illustrating a method of performing voice input with respect to the second scenario of the voice assistant controller, according to an embodiment.

FIG. 11C is a schematic diagram 1161 illustrating a method to perform operations based on a voice input with respect to the second scenario of the voice assistant controller 830, according to an embodiment.

At S1171, the method includes receiving the voice command from the user as "Please call person X while turning off airplane mode".

At S1181, the method includes determining the slot 2 as "airplane mode" of the first user intent and performing the slot 2 by turning OFF the airplane mode. Similarly, the method includes determining the slot 1 as "please call person X".

At S1191, the method includes extracting the second user intent from the slot 1 and perform the slot 1 by making call to person X.

Figure 12A:
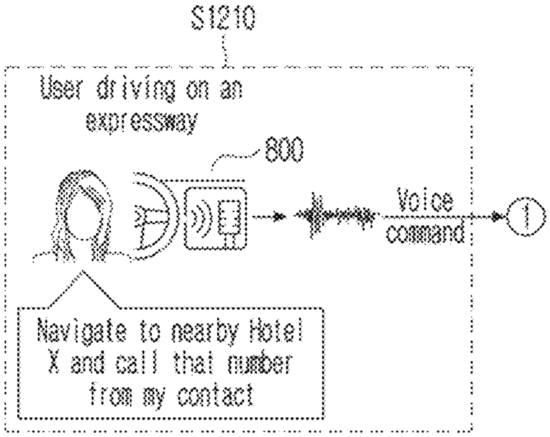
FIG. 12A is a schematic diagram illustrating a third scenario of the voice assistant controller for handling voice input, according to an embodiment.

FIG. 12A is a schematic diagram 1200 illustrating a third scenario of the voice assistant controller 830 for handling voice input, according to an embodiment.

For example, at S1210, when the user driving on an expressway, the user has gone to nearby Hotel X and make a call to Hotel X. So, the user gives voice commands including voice input like "Navigate to nearby Hotel X and call that number from my contact" to the voice assistant device 800. At S1220, the ASR/NL interpretation module 840 of the voice assistant controller 830 receives the voice command from the user and sends to the classifier module 850. The intent classifier 850*b* determines the first user intent from the received voice command. The voice assistant device 800 determines the first user intent as "navigate" from the received voice command as shown in Table 13. The contextual domain classifier engine 850*a* determines the domain of the received voice command from the user. For example, the contextual domain classifier engine 850*a* determines the "map" as the domain from the received voice input. The classifier module 850 sends the determined first user intent, domain of the first user intent and voice command as the text input to the related/unrelated slot extractor module 860.

TABLE 13

| Voice command | First user intent |
|---|---|
| Navigate to nearby Hotel X and call that number from my contact | Navigate |

At S1240, the related/unrelated slot extractor module 860 segregates the first user intent as "navigate", the slots related to the first user intent as "nearby Hotel X" and the slots unrelated to the first user intent as "call that number from my contact" as shown in Table 14. The current action related slot identifier 860*a* of the related/unrelated slot extractor module 860 determines the first user intent as "navigate" and the slots related to the first user intent as "nearby Hotel X".

TABLE 14

| Voice command | First user Intent | Slots Identified for First user Intent | Additional Slot for first user intent | slots unrelated to first user intent |
|---|---|---|---|---|
| Navigate to nearby Hotel X and call that number from my contact | Navigate | location: nearby Hotel X | Null | call that number from my contact |

Further, at S1240, the unrelated slot-to-intent action extractor 860*b* of the related/unrelated slot extractor module 860 determines whether the slots unrelated to the first user intent is available. For example, the unrelated slot-to-intent action extractor 860*b* determines the "call that number from my contact" as the slots unrelated to the first user intent. The unrelated slot-to-intent action extractor 860*b* sends the slots unrelated to the first user intent and the slots related to the first user intent ("nearby Hotel X") as an input to the ASR/NL interpretation module 840 which transfers the received input to the classifier module 850 for determining the second user intent and the domain of the second user intent. For example, the intent classifier 850*b* determines the "make call" as second user intent as shown in Table 15. The contextual domain classifier engine 850*a* determines the domain of the received voice command from the user. For example, the contextual domain classifier engine 850*a* determines the "intelligent things" as the domain from the received second user intent. The classifier module 850 sends the determined second user intent, domain of the second user intent, and the voice command as the text input to the related/unrelated slot extractor module 860.

TABLE 15

| Voice command | Second user intent |
|---|---|
| call that number from my contact | Make call |

The current action related slot identifier 860*a* of the related/unrelated slot extractor module 860 determines the second user intent as the current intent and transfers the second user intent to the performance manager 870. The unrelated slot-to-intent action extractor 860*b* of the related/unrelated slot extractor module 860 checks whether the slot unrelated to the second user intent is available or not. When the slot unrelated to the second user intent is available, the voice assistant controller determines the next user intent by repeating the same procedures which are used to determine the first user intent and the second user intent as represented in S1240. When the slot unrelated to the second user intent is not available, the unrelated slot-to-intent action extractor 860*b* of the related/unrelated slot extractor module 860 halts to perform an operation based on the next user intent as represented in S1241. For example, the related/unrelated slot extractor module 860 determines the second user intent as "make call", the slots related to the second user intent as "contact name", the additional slot for second user intent as "Hotel X" and unrelated slot of the second user intent is "NULL" from the voice command of "call that number from my contact" as shown in Table 16. When the unrelated slot of the second user intent is available, the unrelated slot-to-intent action extractor 860*b* of the related/unrelated slot extractor module 860 determines the next user intent and send the next user intent to the performance manager 870. At S1250, once the performance manager 870 receives the first user intent ("navigate to Hotel X") and sends the first user intent as the current action to the action performing module 880. Similarly, once the performance manager 870 receives the second user intent (call Hotel X) and sends the second user intent as the current action to the action performing module 880.

TABLE 16

| Voice command | Second user Intent | Slots Identified for second user Intent | Additional Slot for second user Intent | Unrelated Slot of the second user intent |
|---|---|---|---|---|
| call that number from my contact | Make Call | anaphora: there Slot Type: contact Name | Hotel X | NULL |

Figure 12B:
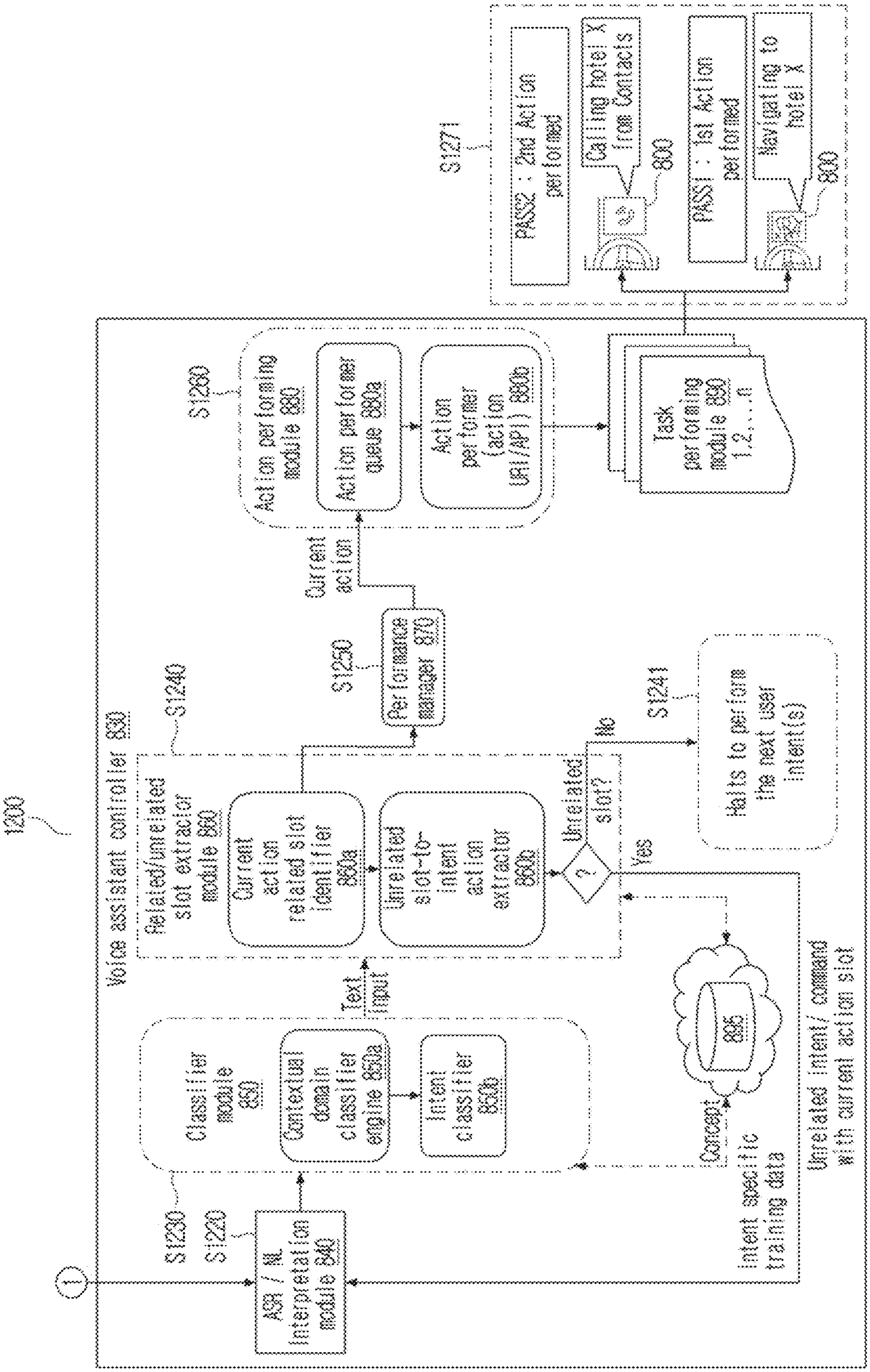
FIG. 12B is a schematic diagram illustrating a third scenario of the voice assistant controller for handling voice input, according to an embodiment.

At S1260, the action performing module 880 creates the plan to perform operations based on the first user intent and the second user intent as shown in Table 17 and 18. The action performer queue 880*a* of the action performing module 880 prioritize the order of the first user intent and the second user intent in the queue to be performed and sends the prioritized order to the task performing module 890. For example, the action performer queue 880*a* prioritizes the order of "navigate to nearby Hotel X" and "call that number from my contact" to be performed. The task performing module 890 navigates to nearby Hotel X and similarly, the task performing module 890 makes a call to Hotel X. Referring to FIG. 12B, at S1271, the voice assistant device 800 displays the navigation as a result of performing the task of the first user intent. To perform an operation based on the second user intent, the related/unrelated slot extractor module 860 determines the "make call" as second user intent and determines the slots as "Hotel X", so the related/unrelated slot extractor module 860 determines that the second user intent is to make a call to Hotel X. The voice assistant device 800 calling Hotel X from the user contact list as represented in S1271.

TABLE 17

| Voice command | First user intent |
|---|---|
| Navigate to nearby Hotel X | Navigate goal in Maps domain with "Hotel X nearby" as slot value for navigate location slot |

TABLE 18

| Voice command | First user intent |
|---|---|
| Call Hotel X Number from my contacts | Make Call goal in Phone App Domain with Slot value Hotel X for the slot type Contact name |

Figure 12C:
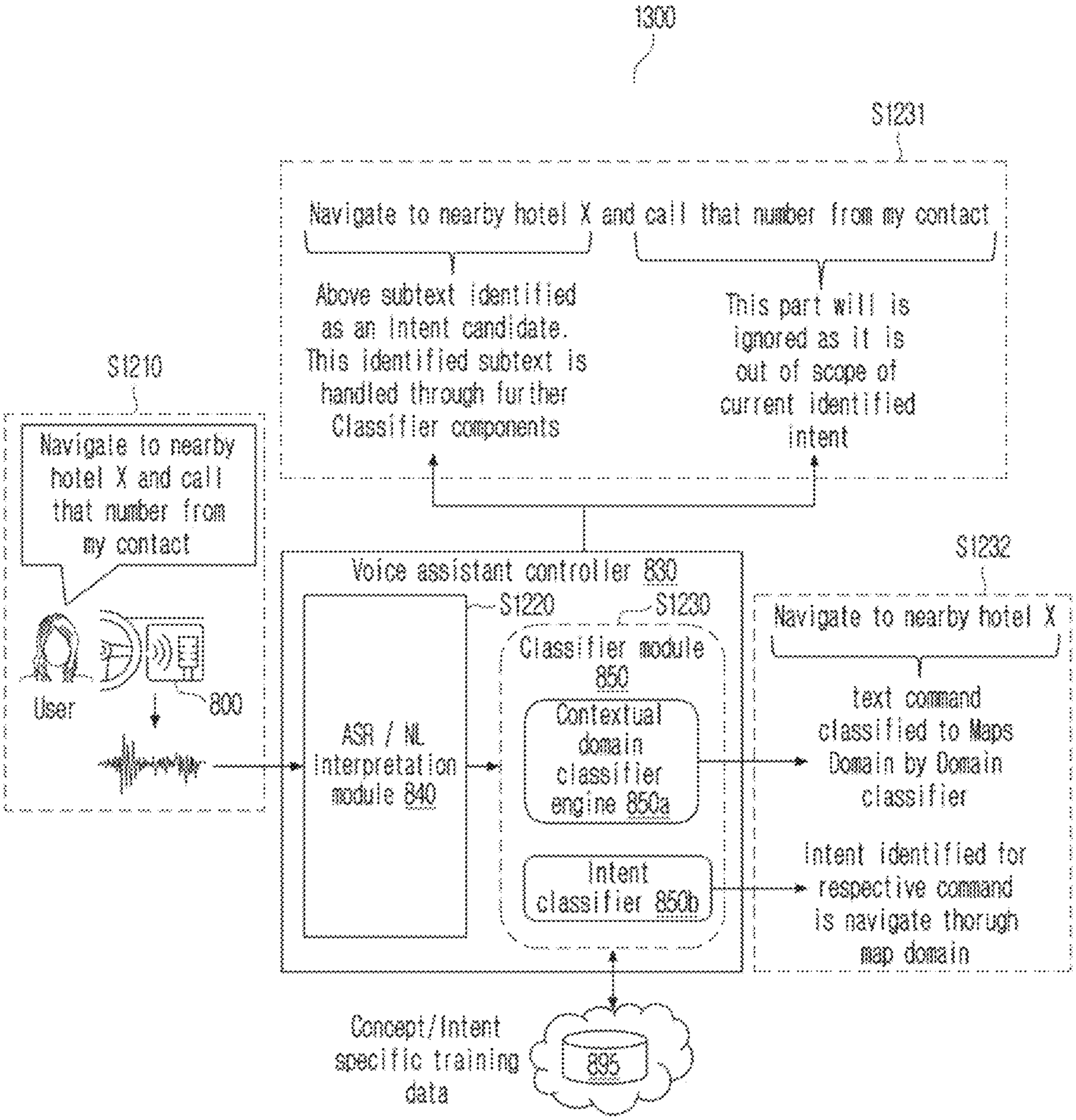
FIG. 12C is a schematic diagram illustrating the voice assistant controller determining a first user intent and a plurality of slots within received voice input with respect to the third scenario using an ASR/NL interpretation module and a classifier module, according to an embodiment.

FIG. 12C is a schematic diagram 1300 illustrating the voice assistant controller 800 determining the first user intent and the plurality of slots within received voice input with respect to the third scenario using an ASR/NL interpretation module 840 and the classifier module 850, according to an embodiment.

At S1210, the ASR/NL interpretation module 840 of the voice assistant device 800 receives the voice command as "Navigate to nearby Hotel X and call that number from my contact" from the user. At S1220, the ASR/NL interpretation module 840 determines the voice command and transcribes the voice to text which is then passed to NL interpretation module to determine the characteristics of text command using various state of art NLP model. At S1232, the classifier module 850 of the voice assistant controller 830 determines the "Navigate to nearby Hotel X" as a current intent candidate (first user intent). The identified subtext of "Navigate to nearby Hotel X" is determined through further classifier components. The classifier module 850 ignores the "call that number from my contact" as out of scope of current intent (first user intent). The contextual domain classifier engine 850*a* determines the domain as "map" for the current intent of "Navigate to nearby Hotel X". The intent classifier 850*b* determines the current intent for respective command is map domain to navigate to the slot value identified for the location slot.

In an embodiment, at S1231, the classifier module 850 of the voice assistant controller 830 tokenizes the voice command based on characteristics and identifies a subtext which is expected candidate for the current intent (first user intent). The subtext "Navigate to nearby Hotel X" is identified as current intent candidate. The subtext out of scope of current identified intent candidate is "call that number from my contact". The classifier module 850 additionally determines the additional slot(s) sent by the related/unrelated slot extractor module 860 to identify the domain/second user intent of the voice command. In such a scenario, no additional slot is available since this is the beginning of the performance of voice command.

Further, at S1230, the contextual domain classifier engine 850*a* determines the voice command and considers identified subtext to classify the subtext in a particular domain (in this case "Navigate to nearby Hotel X"). The Rule based Natural Language Understanding (RNLU) and Dynamic Natural Language Understanding (DNLU) modules determine the "Navigate to nearby Hotel X" text part of the voice command to identify the characteristics of text based on state of art trained model and detects the domain in which the respective text is classified. The text "Navigate to nearby Hotel X" classified to maps domain. The intent classifier 850*b* extracts the intent information among voice input lies within the identified domain and performs the required actions. The text intent "Navigate to nearby Hotel X" is identified as Navigation goal in Maps domain. Text "call that number from my contact" ignored by both contextual domain classifier engine 850*a* and intent classifier 850*b* as attention score generated is low.

Figure 12D:
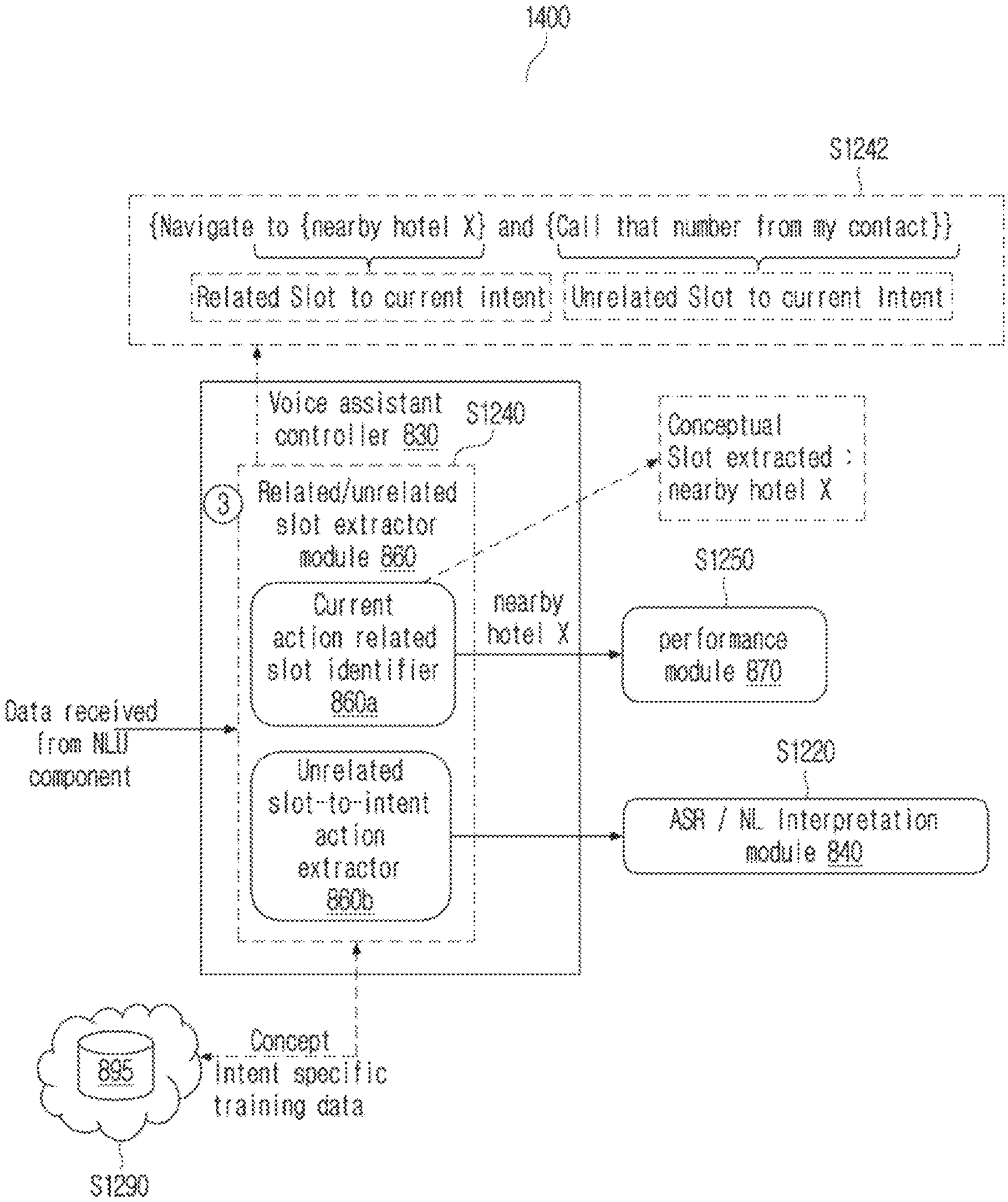
FIG. 12D is a schematic diagram illustrating the voice assistant controller extracting a related slot and an unrelated slot of the first user intent, within received voice input, with respect to the third scenario using a related/unrelated slot extractor module, according to an embodiment.

FIG. 12D is a schematic diagram 1400 illustrating the voice assistant controller 830 extracts the related slot and the unrelated slot of the first user intent, within received voice input with respect to the third scenario using the related/unrelated slot extractor module 860, according to an embodiment.

At S1242, the related/unrelated slot extractor module 860 extracts the slots related to the first user intent as "nearby Hotel X" and slots unrelated to the first user intent as "call that number from my contact". The current action related slot identifier 860*a* detects the plurality of slots which are "nearby Hotel X", "call that number from my contact". The current action related slot identifier 860*a* sends the first user intent ("navigate") and slots related to the first user intent ("nearby Hotel X") to the performance manager 870. The unrelated slot-to-intent action extractor 860*b* sends slot unrelated to the first user intent ("call on that number from my contact") and the slots related to the first user intent ("nearby Hotel X") to the ASR/NL interpretation module 840

In an embodiment, the current action related slot identifier 860*a* identifies and extracts the slots required for the current action intent and applies a mechanism to check whether the additional slot(s) passed from previous intent(s) is required or not for the current intent. The current action related slot identifier 860*a* filters out the additional slot data when the additional slot does not lie in the current scope of performance. In such a scenario, no additional slot received from previous intent (as this is the first intent being determined), so the final slot identified for the current intent is "nearby Hotel X" and passes the "nearby Hotel X" information to the performance manager 870 as represented in S4*c*.

In an embodiment, the unrelated slot-to-intent action extractor 860*b* identifies the unrelated slot for current intent which is a next candidate intent: "call on that number from my contact". The current intent slot(s) as additional slot from the current action related slot identifier 860*a*: nearby "Hotel X". After extracting all required data, the unrelated slot-to-intent action extractor 860*b* plans and send the information to the ASR/NL interpretation module 840 in the form of text to perform an operation based on the next expected intent.

Figure 12E:
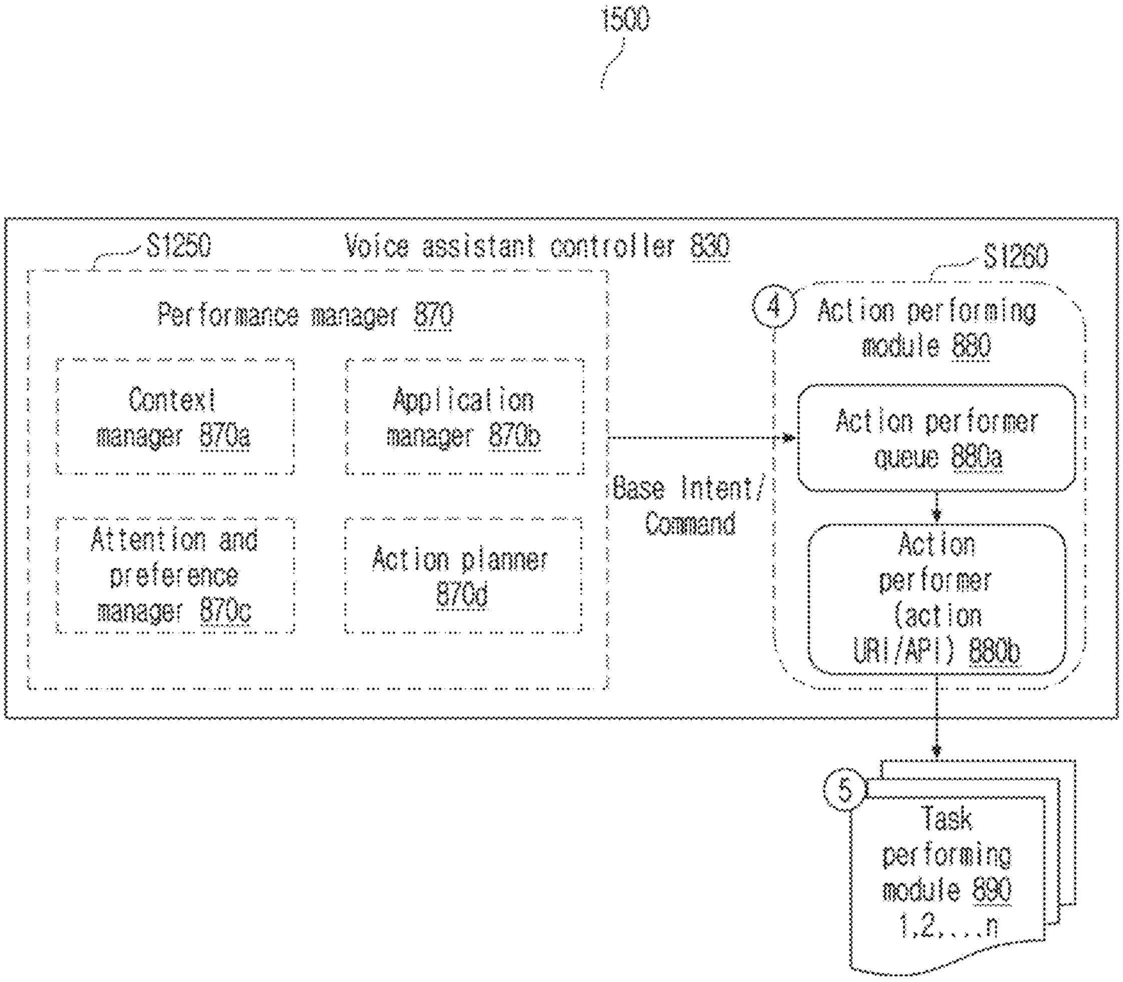
FIG. 12E is a schematic diagram illustrating the voice assistant controller performing an operation based on the first user intent using a performance manager, according to an embodiment.

FIG. 12E is a schematic diagram 1500 illustrating the voice assistant controller 830 performs the first user intent using a performance manager 870, according to an embodiment.

At S1250, the performance manager 870 includes a context manager 870*a*, an application manager 870*b*, an attention and preference manager 870*c*, and an action planner 870*d*. The performance manager 870 receives input from related/unrelated slot extractor module 860 and creates NL intent and push action execution plan information to the action performer queue 880*a*. After receiving all intents details from current command, the action performer 880*b* performs the actions in sensible order.

In an embodiment, the context manager 870*a* keeps track of the conversational context details and device status, the application manager 870*b* keeps track of the details of installed applications on the device, the attention and preference manager 870*c* keep track of the User preferences for task execution. The action planner 870*d* dynamically generates a program by constructing an efficient action plan that starts with the user-provided inputs and ends with the goal.

Figure 12F:
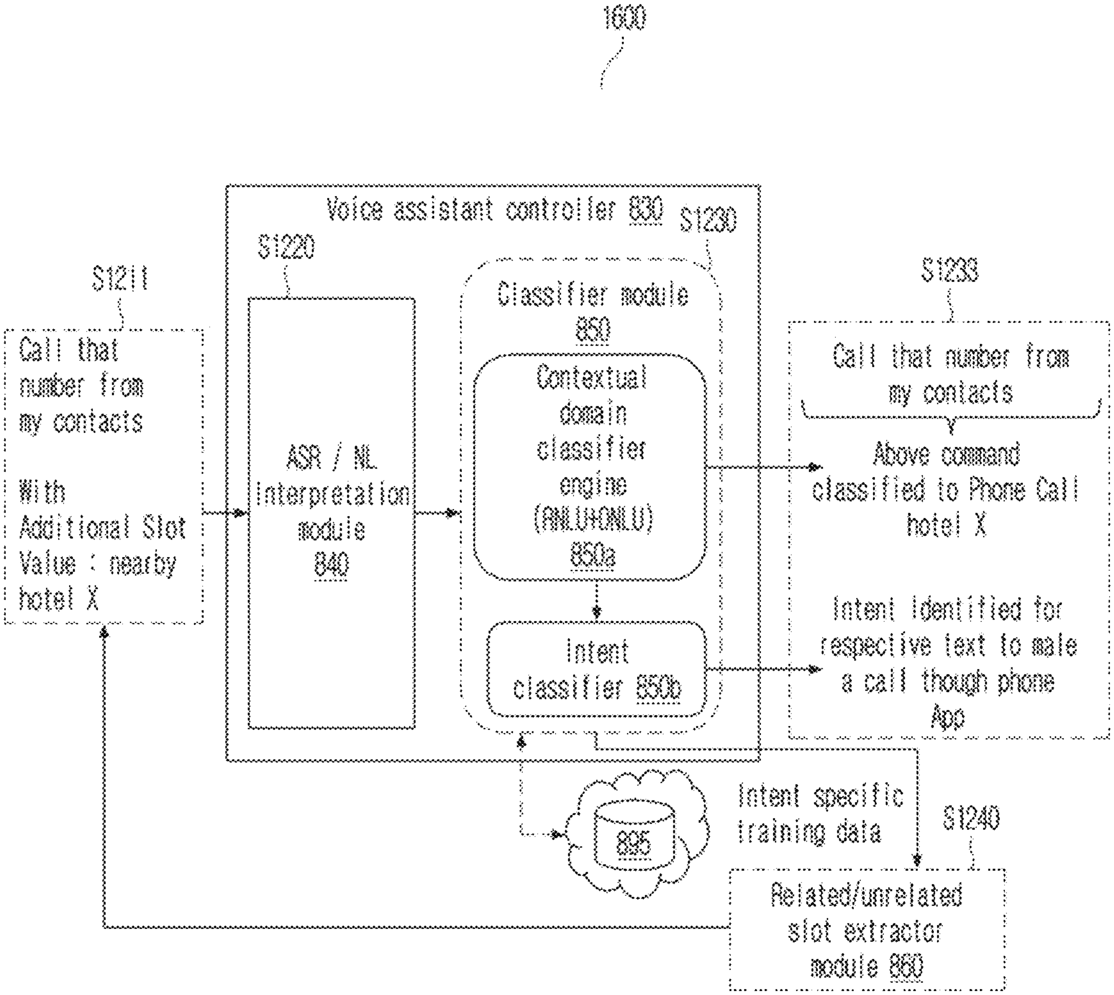
FIG. 12F is a schematic diagram illustrating the voice assistant controller determining the second user intent from the plurality of slots of the first user intent with respect to the third scenario using the ASR/NL interpretation module and the classifier module, according to an embodiment.

FIG. 12F is a schematic diagram 1600 illustrating the voice assistant controller 830 determining the second user intent from the plurality of slots of the first user intent with respect to the third scenario using the ASR/NL interpretation module 840 and the classifier module 850, according to an embodiment.

At S1211, the related/unrelated slot extractor module 860 sends the voice command ("call that number from my contacts") to the ASR/NL interpretation module 840 of the voice assistant controller 830. The voice assistant controller 830 generates the higher attention to only available part of voice command from the voice input after determined with the previous intent (first user intent). The contextual domain classifier engine 850*a* determines a subtext which is expected candidate for current intent ("Call that number from my contacts"). The RNLU and DNLU modules of the contextual domain classifier engine 850*a* determines the "call that number from my contacts" to identify the characteristics of text based on state of art trained model and predicts the domain in which the respective text is classified. In such a scenario, the text ("call that number from my contacts") is classified to phone app domain. The intent classifier 850*b* extracts intent for text 'Call that number from my contacts' and identify intent as to make a call in phone App domain that is represented in S1233.

Figure 12G:
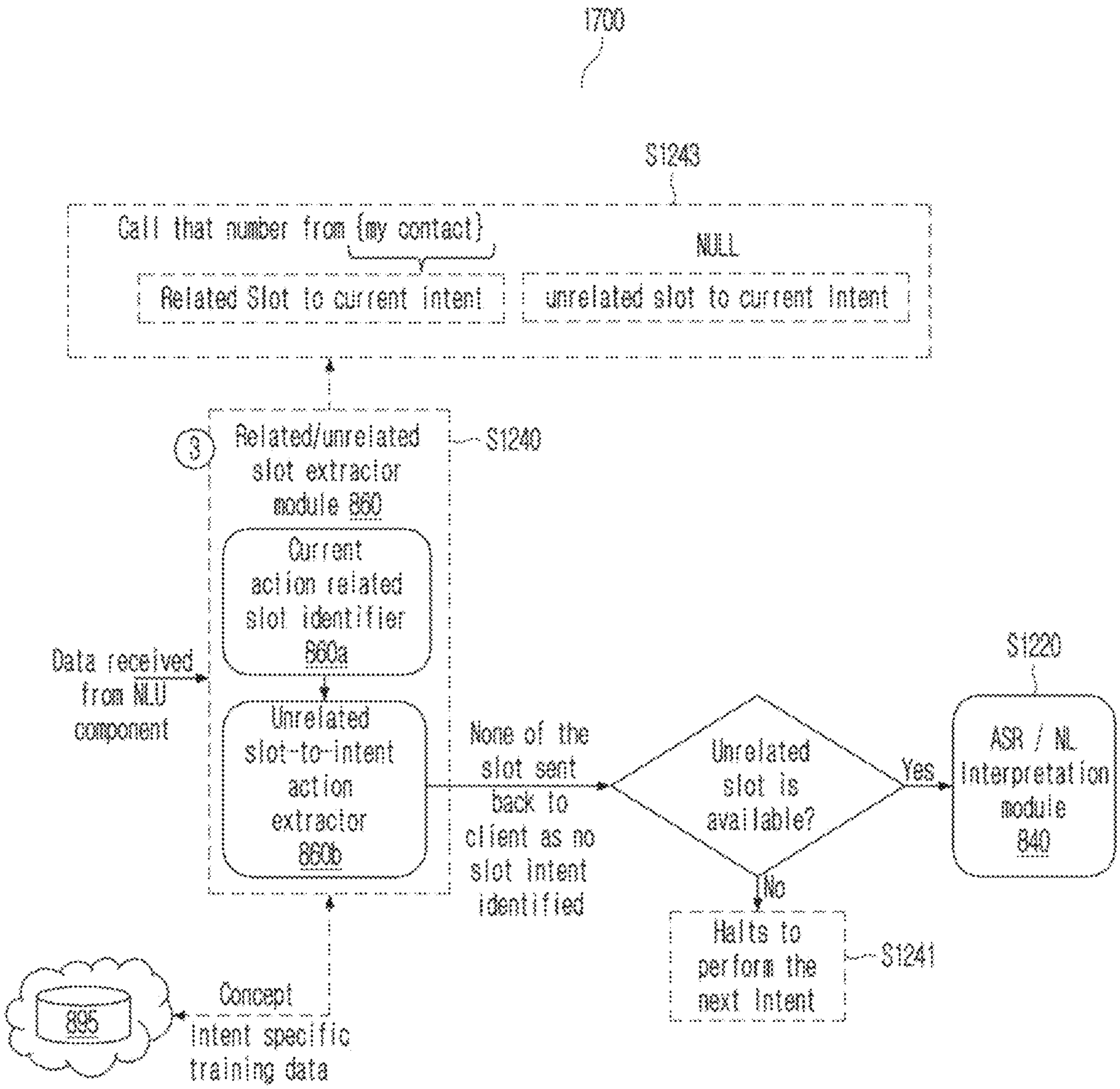
FIG. 12G is a schematic diagram illustrating the voice assistant controller extracting the first user intent and a second user intent from the plurality of slots of the first user intent within received voice input with respect to the third scenario using a related/unrelated slot extractor module, according to an embodiment.

FIG. 12G is a schematic diagram 1700 illustrating the voice assistant controller 830 extracts the first user intent and a second user intent from the plurality of slots of the first user intent within received voice input with respect to the third scenario using a related/unrelated slot extractor module 860, according to an embodiment.

As represented in S1243, the current action related slot identifier 860*a* of the related/unrelated slot extractor module 860 determines and exacts the slots required for the current action intent (second user intent). The current action related slot identifier 860*a* applies mechanism to check whether the additional slot(s) passed from previous intent(s) is required or not for the current intent (second user intent). The current action related slot identifier 860*a* filters out the additional slot data when that does not lie in the current scope of the performance. In such a scenario, the additional slot of "Hotel X" is received from previous intent (first user intent) which is replaced with anaphora there so the final slot identified for the current intent is "Hotel X" as slot type my contact. The current action related slot identifier 860*a* passes the information to performance manager 870. The unrelated slot-to-intent action extractor 860*b* checks whether the slot unrelated to the current intent (second user intent) is available or not. When the slot unrelated to the current intent, the unrelated slot-to-intent action extractor 860*b* halts to perform an operation based on the next user intent. In third scenario, there is no unrelated slot is identified for the second user intent.

Figure 12H:
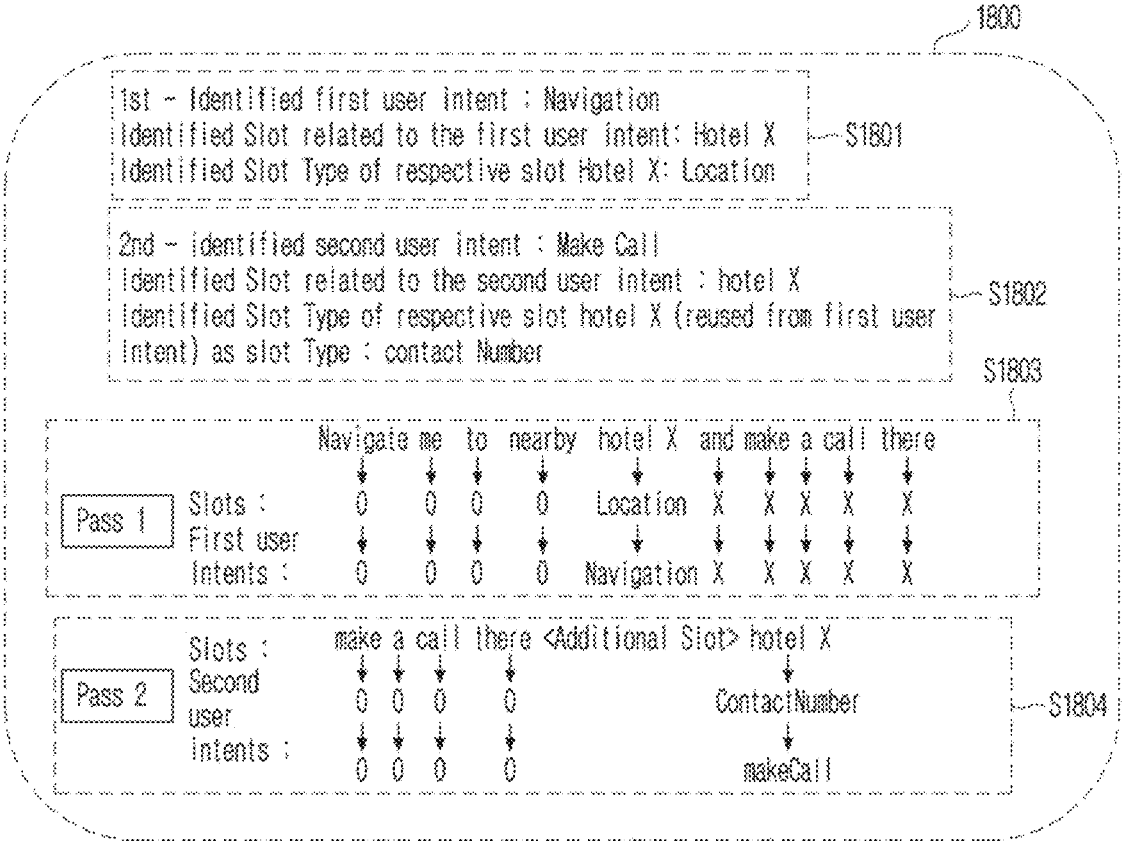
FIG. 12H is a schematic diagram illustrating a segregation of the first user intent, the plurality of slots, and a second user intent from the plurality of slots based on received voice input from the user, according to an embodiment.

FIG. 12H is a schematic diagram 1800 illustrating a segregation of the first user intent, the plurality of slots, and a second user intent from the plurality of slots based on received voice input from the user, according to an embodiment.

For example, the user gives the input voice command to the voice assistant device 800, when the user driving the car. The voice input is like "Navigate me to nearby Hotel X and make a call there". Once the voice assistant device 800 receives the voice input from the user, the voice assistant device 800 classifies the first user intent and the slot related to the first user intent from the received voice command as represented in S1801. The voice assistant device 800 identifies the first user intent as "Navigation", identifies the slot related to the first user intent as "Hotel X", and identifies the slot type of respective slot Hotel X as "Location" that is represented as "O" in S1803. Once the voice assistant device 800 identifies the first user intent and slot related to the first user intent from the received voice input, the voice assistant device 800 navigates the location of Hotel X which is displayed on the display of the voice assistant device 800 and at this time the voice assistant device determines the "make a call there" as a slot unrelated to the first user intent which is represented as "O". Similarly, the voice assistant device 800 identifies the second user intent as "make call", identifies the slot related to the second user intent as "Hotel X", and reusing the slot related to the first user intent (Hotel X) to identify the slot type as "contact number" for second user intent that is represented "O" in S1802. Once the voice assistant device 800 identifies the second user intent and slot related to the second user intent, the voice assistant device 800 performs an operation based on the second user intent ("make a call there") by taking the slots related to the first user intent (Hotel X) as reference to make a call to Hotel X as represented in S1804.

Figure 13:
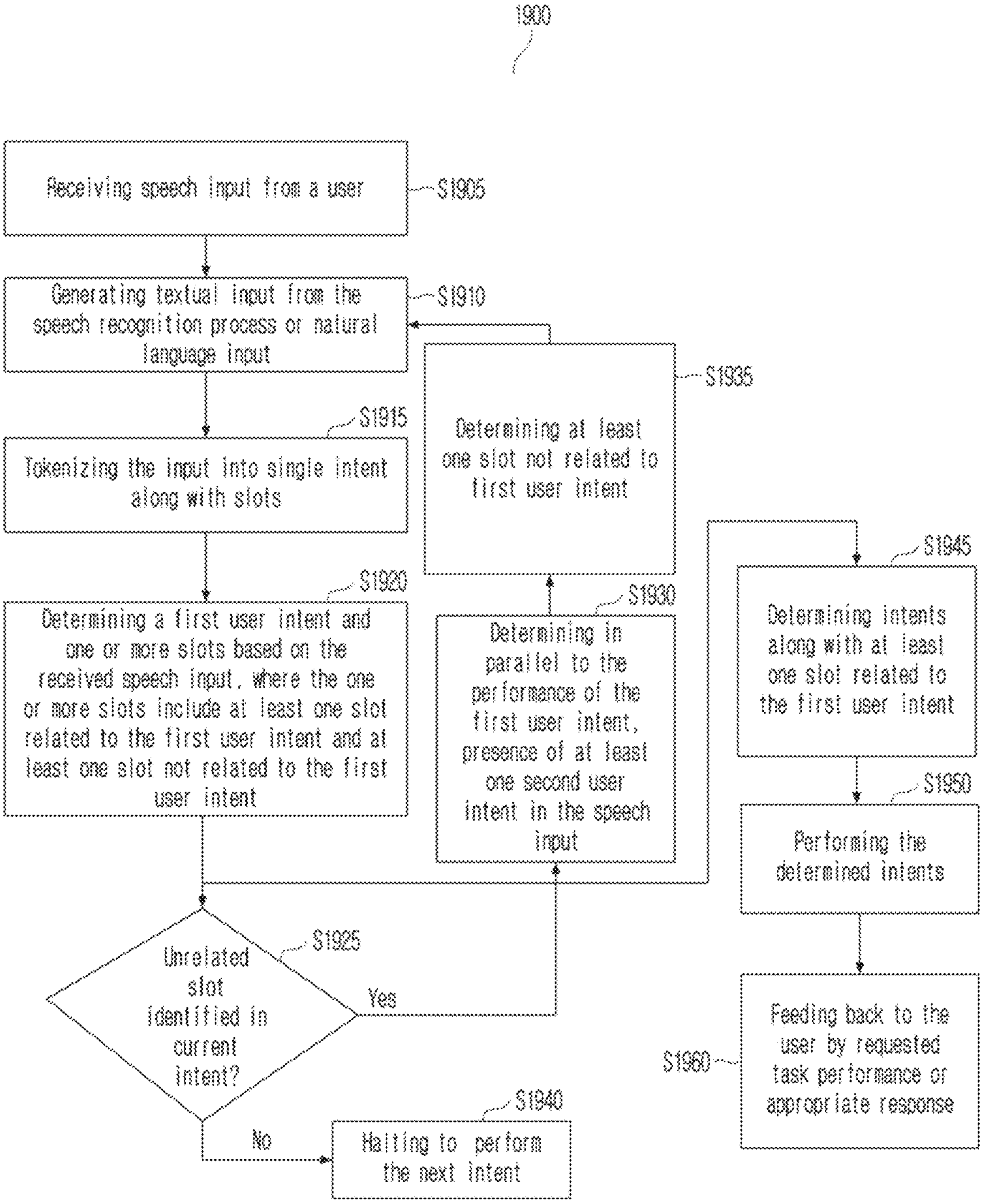
FIG. 13 is a flow chart illustrating a method for handling a determined intent, according to an embodiment.

FIG. 13 is a flow chart 1900 illustrating a method for performing an action based on an identified intent, according to an embodiment.

At S1905, the method includes receiving speech input from the user.

At S1910, the method includes generating textual input from the speech recognition process or natural language input.

At S1915, the method includes tokenizing the input into single intent along with slots.

At S1920, the method includes identifying a first user intent and one or more slots based on the received speech input, where the one or more slots include at least one slot related to the first user intent and at least one slot not related to the first user intent.

At S1925, the method includes determining whether the unrelated slot identified in the current intent (first user intent.

At S1930, the method includes determining in parallel to the performance of an action based on the first user intent, the presence of at least one second user intent in the speech input.

At S1935, the method includes determining at least one slot not related to first user intent.

At S1940, the method includes halting to perform an operation based on the next intent.

At S1945, the method includes determining intents along with at least one slot related to the first user intent.

At S1950, the method includes performing operations based on the determined intents.

At S1960, the method includes feeding back to the user by requested task performance or appropriate response.

The various actions, acts, blocks, steps, or the like in the method is performed in the order presented, in a different order or simultaneously. Further, in one or more embodiments, some of the actions, acts, blocks, steps, or the like are omitted, added, modified, skipped, or the like without departing from the scope of the proposed method.

Figure 14:
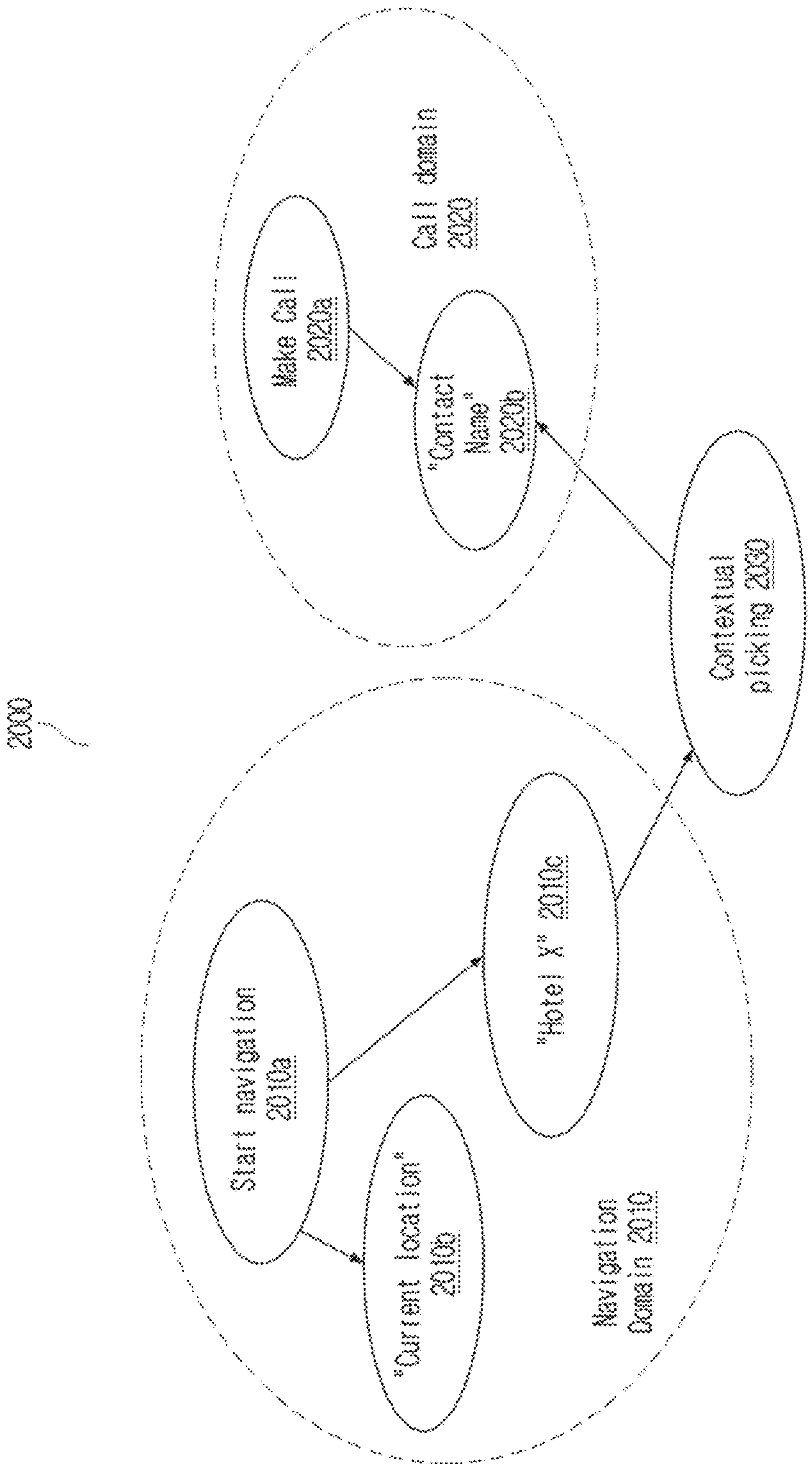
FIG. 14 is a schematic diagram illustrating a scenario of determining an entity value of a particular entity type to be used across the voice input, according to an embodiment.

FIG. 14 is a schematic diagram 2000 illustrating a scenario of determining an entity value of a particular entity type to be used across the voice input, according to an embodiment.

The voice assistant device 800 iterating the voice command multiple times to identify voice input with respective entities related to intents. For example, when the user provides the voice command like "navigate to nearby Hotel X and make a call there". Here the same entity value is identified as two different entity type "Hotel X" 2010*c* for "Start Navigation" 2010*a* and "Contact Name" 2020*b* for "Make Call" 2020*a* respectively. The voice assistant device 800 prioritizes to perform an operation based on the intent based on the intent ranking. Also, the navigation domain 2010 considers the current location 2010*b* of the user for starting the navigation. The voice assistant device 800 picking the context 2030 of "Hotel X" 2010*c* from the navigation domain 2010 and using the "Hotel X" 2010*c* with the "contact name" 2020*b* of the call domain 2020 to perform the task of making a call to Hotel X.

Figure 15A:
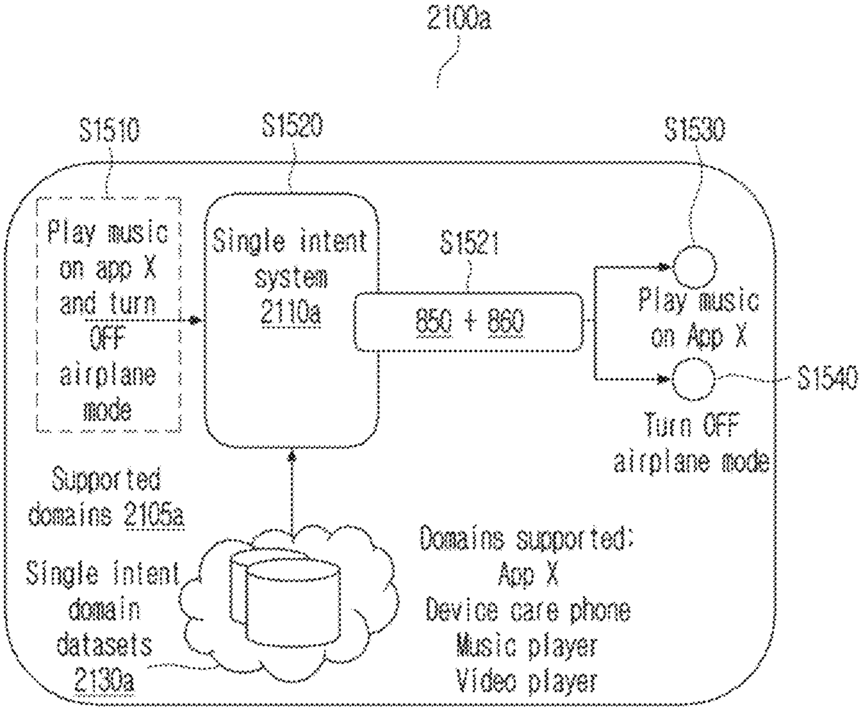
FIG. 15A is a schematic diagram illustrating a single intent system, according to an embodiment.
Figure 15B:
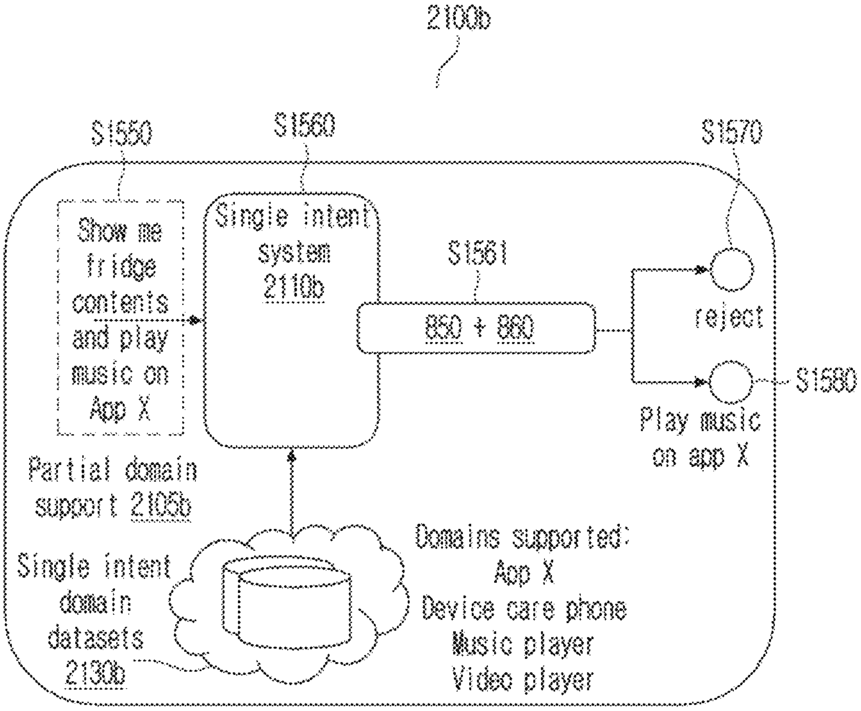
FIG. 15B is a schematic diagram illustrating a single intent system, according to an embodiment.

FIG. 15A and FIG. 15B are schematic diagrams (2100*a* and 2100*b*) illustrating a single intent system (2110*a* and 2110*b*), according to an embodiment.

In an embodiment, referring to FIG. 15A, at S1510, for example, in supporting domains 2105*a* scenario the user provides the voice input to the single intent system 2100*a*. the voice input is like "play music on app X and turn OFF airplane mode" S1530. At S1520 and S1521, the classifier module 850 and the related/unrelated slot extractor module 860 of the single intent system 2110*a* receives the voice input and determines the first user intent, slot related to the first user intent, slot unrelated to the first user intent, domain of the first user intent. Similarly, the single intent system 2110*a* determines the second user intent, slot related to the second user intent, domain of the second user intent from the slot unrelated to the first user intent. At S1530, the voice assistant device 800 performs an operation based on the first user intent ("play music on app X"). At S4, the voice assistant device 800 performs an operation based on the second user intent ("turn OFF airplane mode"). Here, the single intent system 2110*a* supports the domains 2105*a* (app X, device care phone, music player, Video player) which is related to perform an operation based on the intent of "play music on app X and turn OFF airplane mode". Referring to FIG. 15A, the domain supported: App X, Device care phone, Music player, Video player. The single intent domain datasets 2130*a* train the determined first user intent, second user intent and the plurality of slots to predict the next user intent and the next plurality of slots in the next voice input.

In an embodiment, referring to FIG. 15B, at S1550, for example, the user provides the voice input to the single intent system 2100*b*. the voice input is like "Show me fridge contents and play music on App X". At S1560 and S1561, the classifier module 850 and the related/unrelated slot extractor module 860 of the single intent system 2110*b* receives the voice input and determines the first user intent, slot related to the first user intent, slot unrelated to the first user intent, domain of the first user intent. Here, the single intent system 2110*b* at least supports the domains 2105*b* (app X, device care phone, music player, Video player) which is related to performing an operation based on the intent of "play music on app X, but the single intent system 2110*b* does not perform an operation based on the intent "turn OFF airplane mode", when the single intent system 2110*b* unable to support the domains related to the intent "Show me fridge contents". Similarly, the single intent system 2110*b* determines the second user intent, slot related to the second user intent, domain of the second user intent from the slot unrelated to the first user intent. At S1570, the voice assistant device 800 rejects the first user intent ("Show me fridge contents"). At S1580, the voice assistant device 800 performs an operation based on the second user intent ("play music on app X"). The single intent domain datasets 2130*b* train the determined first user intent, second user intent and the plurality of slots to predict the next user intent and the next plurality of slots in the next voice input.

Referring to the single intent system (2110*a* and 2110*b*) supports voice commands with no additional resource complexities as of existing multi-intent systems. Being with lesser data, the data complexity, the modelling complexity, the latency for prediction and results is enhanced and better coverage of domains and user experience.

Figure 16:
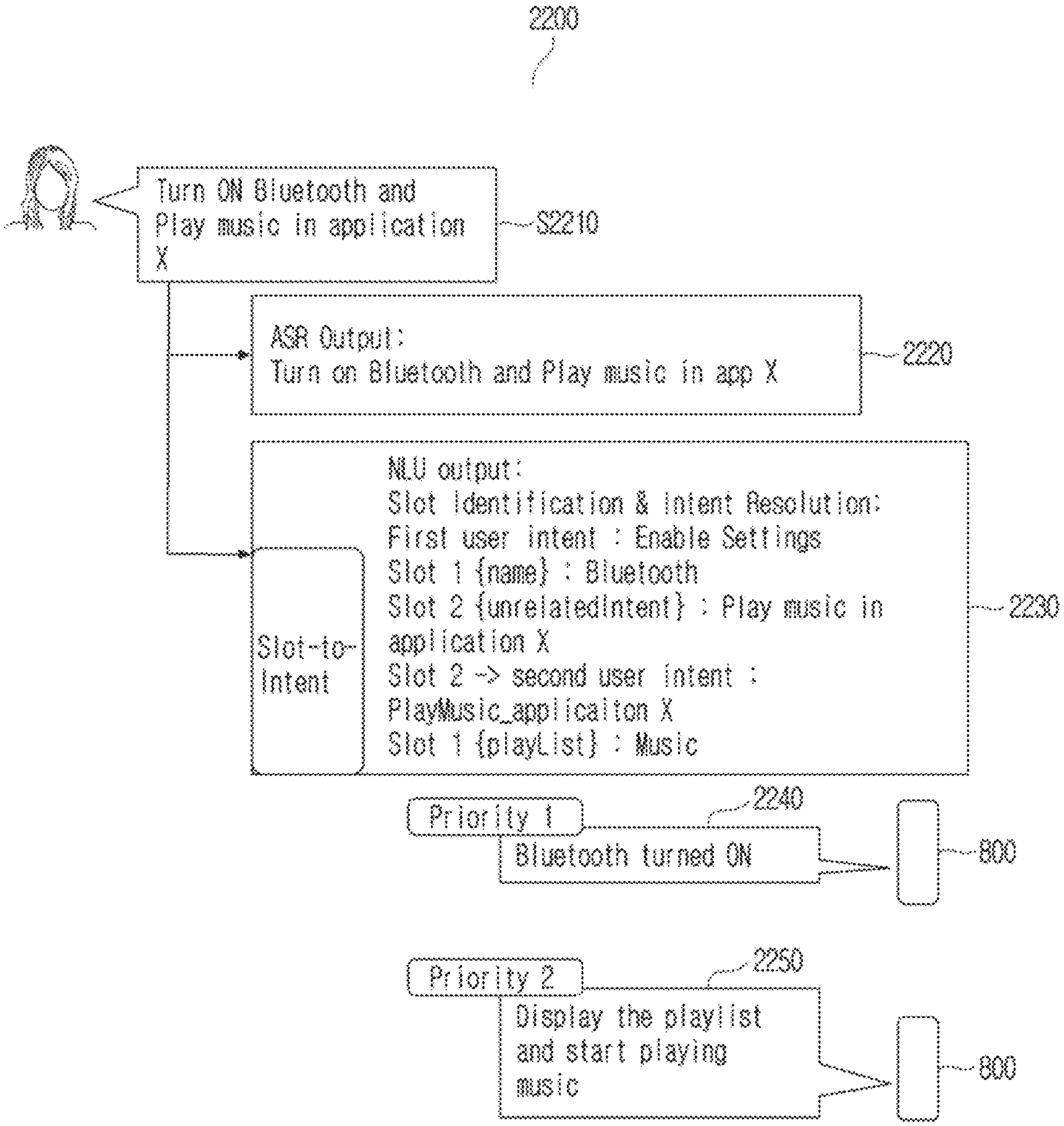
FIG. 16 is a schematic diagram illustrating a fourth scenario of the voice assistant device performing operations based on the voice input, according to an embodiment.

FIG. 16 is a schematic diagram 2200 illustrating a fourth scenario of the voice assistant device 800 performs an operation based on the voice input, according to an embodiment.

At S2210, the method includes receiving the voice command from the user. The voice command is "turning ON Bluetooth and play music in application X".

At S2210, the method includes recognizing the voice command by the ASR features in the voice assistant device 800.

At S2220, the method includes determining the first user intent as "enable setting", slot 1 as "Bluetooth" which is related to the first user intent, a slot 2 as "play music in application X" which is unrelated to the first user intent. Also, the method includes determining the slot 2 as the second user intent.

At S2230, the method includes performing an operation based on the first user intent by turning ON the Bluetooth as the first priority based on the determined first user intent and the slot 1.

At S2240 and At S2250, the method includes performing an operation based on the second user intent by displaying the playlist and start playing the music as the second priority based on determined second user intent and taking slot 1 as reference to play music.

The various actions, acts, blocks, steps, or the like in the method is performed in the order presented, in a different order or simultaneously. Further, in one or more embodiments, some of the actions, acts, blocks, steps, or the like are omitted, added, modified, skipped, or the like without departing from the scope of the proposed method.

Figure 17:
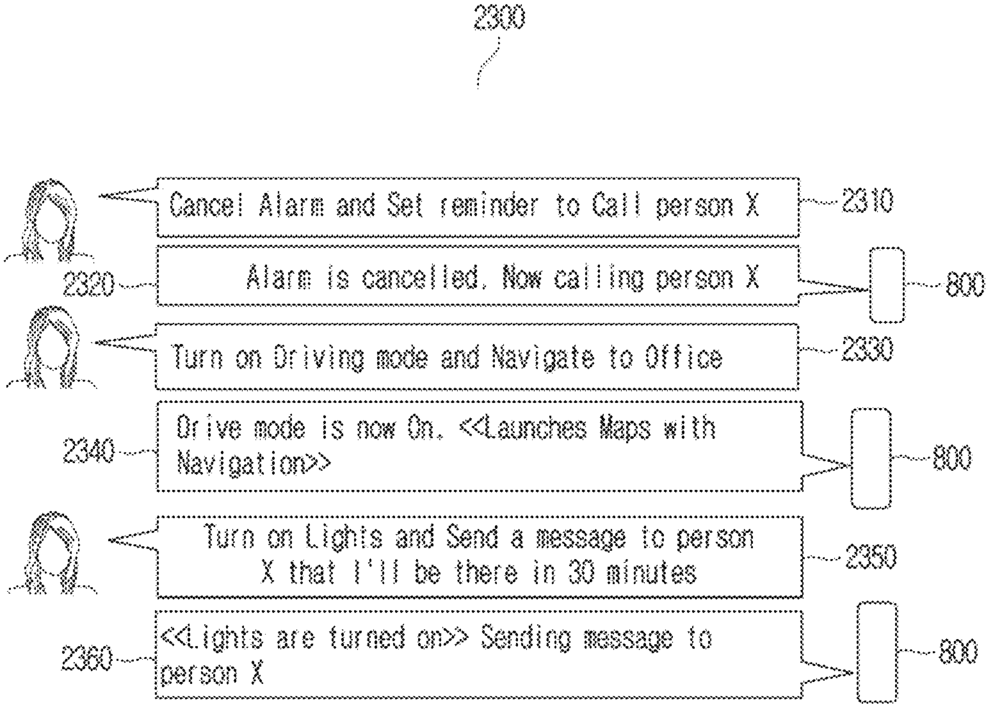
FIG. 17 is a schematic diagram illustrating a fifth scenario of the voice assistant device performing operations based on the voice input, according to an embodiment.

FIG. 17 is a schematic diagram 2300 illustrating a fifth scenario of the voice assistant device 800 performs operations based on the voice input, according to an embodiment.

At S2310, the method includes receiving voice command from the user. For example, the voice command is "cancelling the alarm and set a reminder to call person X".

At S2320, the method includes cancelling the alarm and calling person X.

At S2330, the method includes receiving voice command from the user. For example, the voice command is "Turn on Driving mode and Navigate to Office".

At S2340, the method includes turning ON the drive mode by launching maps with navigation.

At S2350, the method includes receiving voice command from the user. For example, the voice command is "Turn on Lights and Send a message to person X that "I'll be there in 30 minutes".

At S2360, the method includes turning ON the lights and sending message to person X.

Figure 18A:
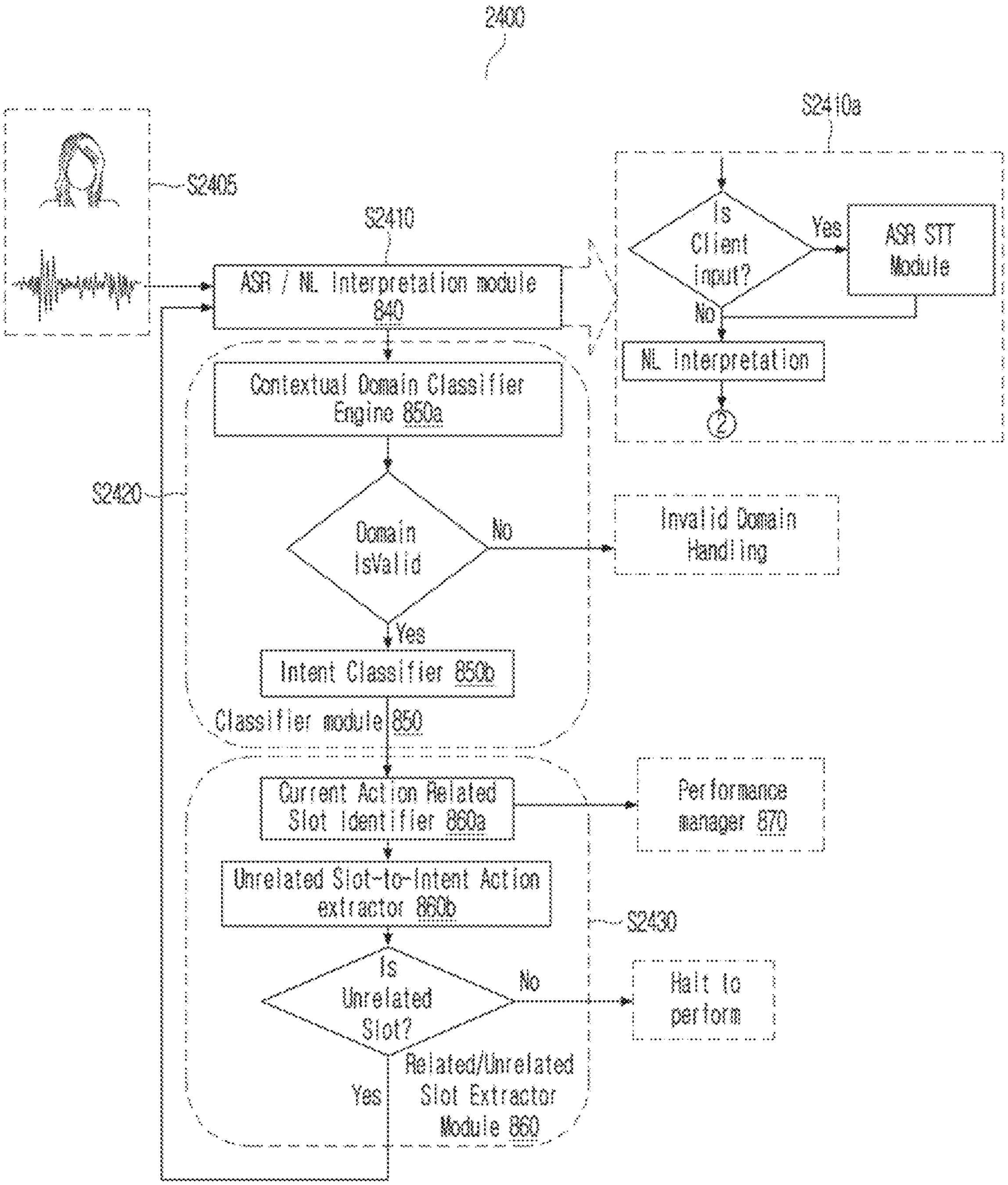
FIG. 18A is a flow chart illustrating a method for determining the first user intent and the plurality of slots of the first user intent, according to an embodiment.

FIG. 18A is a flow chart 2400 illustrating a method for determining the first user intent and the plurality of slots of the first user intent, according to an embodiment.

At S2405, the method includes providing the voice input to the voice assistance device 800. For example, the voice input is "Navigate to nearby Hotel X and call that number from my contact".

At S2410, the method includes receiving the voice input from the user. For example, the voice input is like "Navigate to nearby Hotel X and call that number from my contact".

At S2410*a*, when the ASR/NL interpretation module 840 receives the voice input in the form of voice and send that command to ASR Speech To Text (STT) module to process voice input, the ASR transcribes the voice to text which then passed to NL interpretation module of the ASR/NL interpretation module 840 to process the characteristics of text command using various state of art NLP model. This module also receives slot unrelated to the first user intent to determine again through the model and passes directly to NL interpretation model as voice to text not required.

At S2420, the method includes receiving, by the contextual domain classifier engine 850*a*, the text command and uses the state of art pre-trained DNN language model fine-tuned with supported domain specific trainings classify the domain of text to determine the correctness of the command received. In such a scenario, when the domain is identified as invalid/Not supported by the voice assistant device 800, the input processing is stopped to not repeat meaninglessly. The method includes determining the first user intent as "navigate to nearby Hotel X" and domain and "maps" with respect to the first user intent. Also, the method includes validating the linguistic correctness of the unrelated slot during domain classification. Further, the method includes integrating the contextual domain classifier engine 850*a* with multiple Deep Neural Network (DNN) based state of art Language Model (LM) technique.

At S2430, the method includes determining the second user intent from the voice input based on the slots unrelated to the first user intent. Here the second user intent "call that number from my contact". Also, the method includes detecting the unrelated slot rather validating the linguistic correctness.

The various actions, acts, blocks, steps, or the like in the method is performed in the order presented, in a different order or simultaneously. Further, in one or more embodiments, some of the actions, acts, blocks, steps, or the like are omitted, added, modified, skipped, or the like without departing from the scope of the proposed method.

Figure 18B:
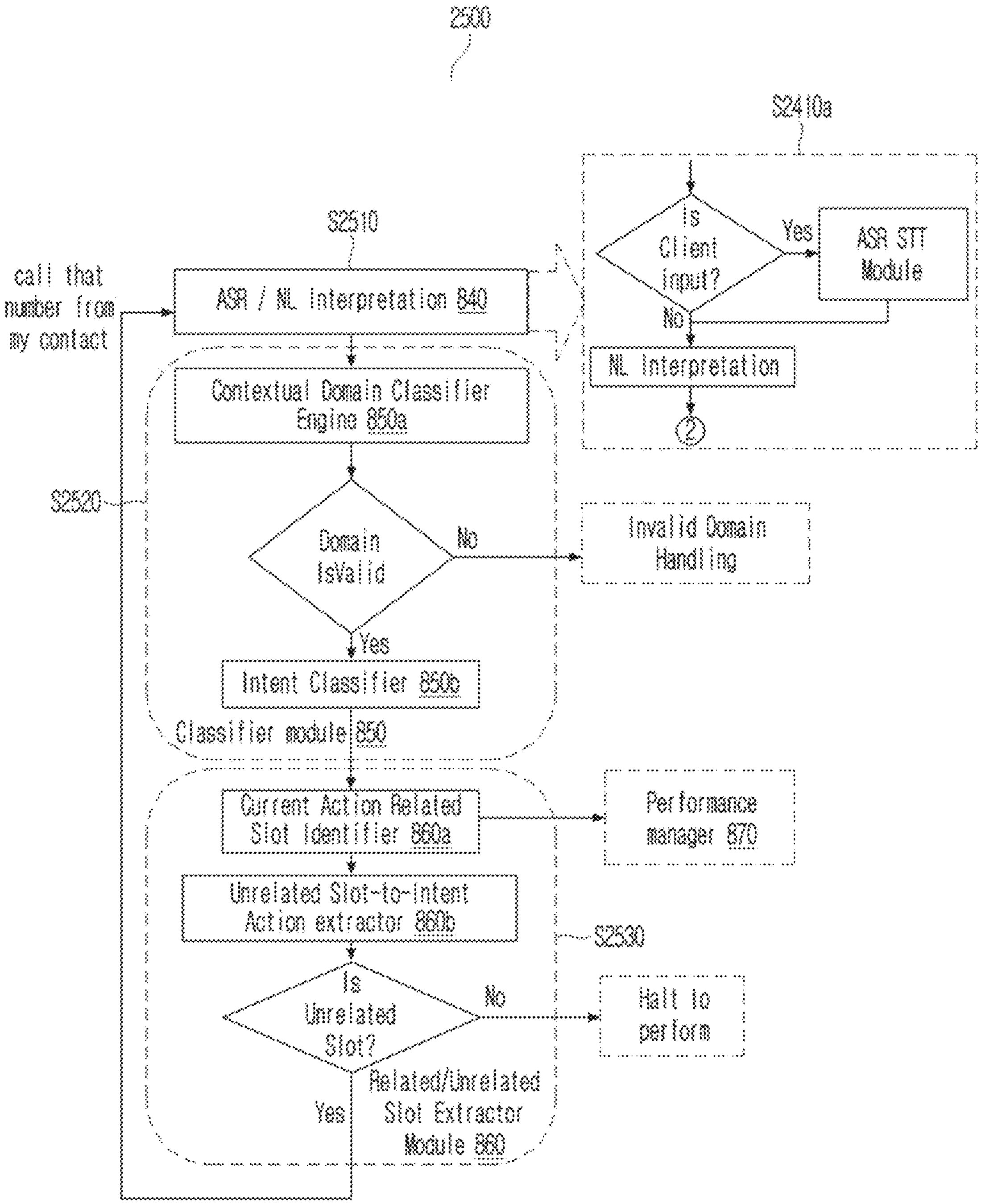
FIG. 18B is a flow chart illustrating a method for determining the second user intent from the plurality of slots of the first user intent, according to an embodiment.

FIG. 18B is a flow chart 2500 illustrating a method for determining the second user intent from the plurality of slots of the first user intent, according to an embodiment.

At S2510, the method includes receiving the second user intent as "call that number from my contact" from the unrelated/related slot extractor module 860.

At S2520, the method includes determines the second user intent and domain of the second user intent.

At S2530, the method includes determining whether the slots unrelated to the second user intent is available or not. When the slots unrelated to the second user intent is available, the unrelated/related slot extractor module 860 determines the next user intent. When the slots unrelated to the second user intent is not available, the unrelated/related slot extractor module 860 halts to perform an operation based on the next user intent.

The various actions, acts, blocks, steps, or the like in the method is performed in the order presented, in a different order or simultaneously. Further, in one or more embodiments, some of the actions, acts, blocks, steps, or the like are omitted, added, modified, skipped, or the like without departing from the scope of the proposed method.

Figure 19:
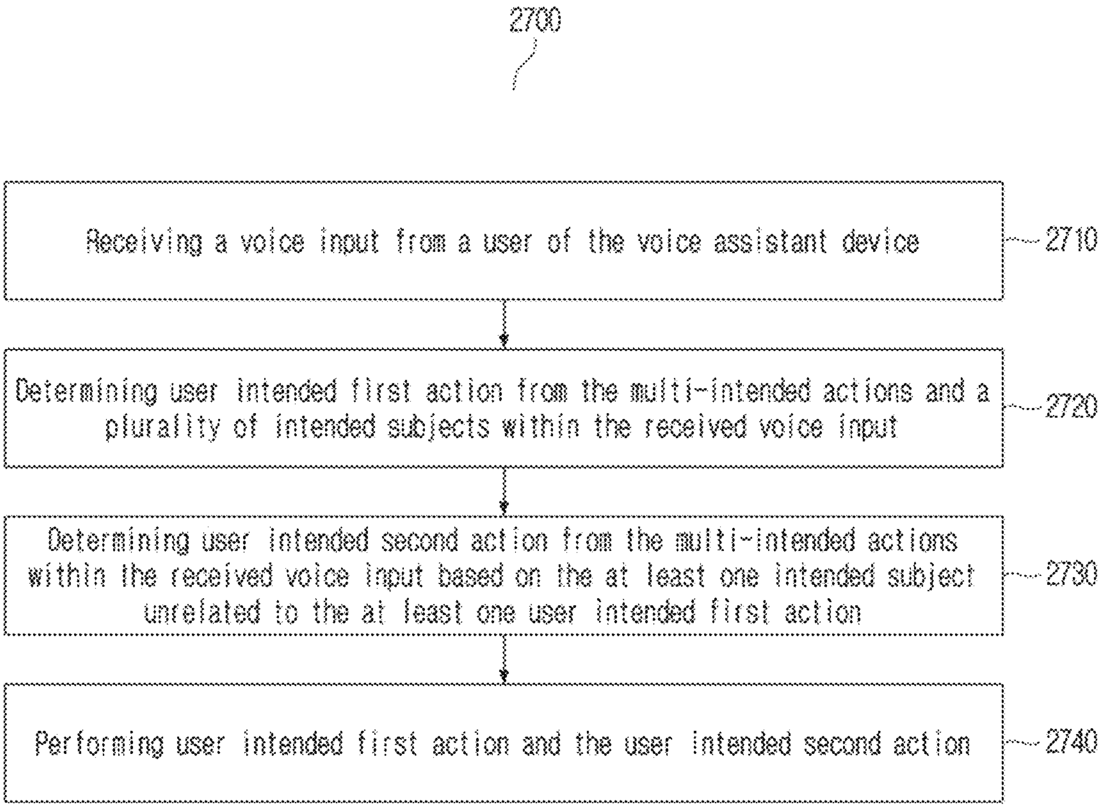
FIG. 19 is a flow chart illustrating a method for performing operations based on the first user intent and the second user intent based on received voice command from the user, according to an embodiment.

FIG. 19 is a flow chart 2700 illustrating a method for performing operations based on the first user intent and the second user intent based on received voice command from the user, according to an embodiment.

At S2710, the method includes receiving the voice input from the user of the voice assistant device 800.

At S2720, the method includes determining the first user intent and the plurality of slots from the received voice input.

At S2730, the method includes determining second user intent from the received voice input based on the at least one slot unrelated to the at least one first user intent.

At S2740, the method includes performing operations based on the first user intent and the second user intent.

The various actions, acts, blocks, steps, or the like in the method is performed in the order presented, in a different order or simultaneously. Further, in one or more embodiments, some of the actions, acts, blocks, steps, or the like are omitted, added, modified, skipped, or the like without departing from the scope of the proposed method.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modification within the scope of the embodiments as described herein.

What is claimed is:

1. A method for handling voice input by a voice assistant device, the method comprising:

receiving, by the voice assistant device, a voice input from a user;

identifying, by the voice assistant device, at least one first user intent and a plurality of slots based on the voice input, wherein the plurality of slots comprises at least one slot related to the at least one first user intent and at least one slot unrelated to the at least one first user intent;

identifying, by the voice assistant device, at least one second user intent based on the voice input and the at least one slot unrelated to the at least one first user intent using a single-intent classifier; and performing, by the voice assistant device, at least one first operation based on the at least one first user intent and at least one second operation based on the at least one second user intent, wherein the identifying, by the voice assistant device, the at least one first user intent and the plurality of slots comprises:

identifying, from among the plurality of slots, the at least one slot related to the at least one first user intent, wherein the at least one slot related to the at least one first user intent is used for the performing the at least one first operation based on the at least one first user intent; and identifying, from among the plurality of slots, the at least one slot unrelated to the at least one first user intent by excluding, from the plurality of slots, the at least one slot related to the at least one first user intent, and wherein the identifying, by the voice assistant device, the at least one second user intent comprises obtaining, from the single-intent classifier, the at least one second user intent by inputting, into the single-intent classifier, the at least one slot unrelated to the at least one first user intent and the at least one slot related to the at least one first user intent.

2. The method of claim 1, wherein the performing, by the voice assistant device, the at least one first operation and the at least one second operation comprises:

identifying a correlation between the at least one first user intent and the at least one second user intent;

identifying, based on the correlation, an order for performing the at least one first operation and the at least one second operation; and performing, based on the order, the at least one first operation and the at least one second operation.

3. The method of claim 1, wherein the identifying, by the voice assistant device, the at least one first user intent comprises inputting the voice input into the single-intent classifier.

4. The method of claim 3, further comprising:

identifying, by the single-intent classifier, at least one domain based on the at least one first user intent and the at least one second user intent.

5. The method of claim 1, further comprising:

based on the plurality of slots including the at least one slot unrelated to the at least one first user intent, performing, by the voice assistant device, the at least one second operation.

6. The method of claim 1, further comprising:

based on the plurality of slots not including the at least one slot unrelated to the at least one first user intent, halting, by the voice assistant device, the at least one second operation.

7. The method of claim 1, wherein the identifying the at least one second user intent is performed in parallel with the performing the at least one first operation.

8. A voice assistant device comprising:

at least one memory storing one or more instructions;

at least one processor coupled to the at least one memory and configured to execute the one or more instructions, wherein the one or more instructions, when executed by the at least one processor, cause the voice assistant device to:

receive a voice input from a user, identify at least one first user intent and a plurality of slots based on the voice input, wherein the plurality of slots comprises at least one slot related to the at least one first user intent and at least one slot unrelated to the at least one first user intent, identify at least one second user intent based on the voice input and the at least one slot unrelated to the at least one first user intent using a single-intent classifier, and perform at least one first operation based on the at least one first user intent and at least one second operation based on the at least one second user intent, wherein the one or more instructions, when executed by the at least one processor, further cause the voice assistant device to:

identify, from among the plurality of slots, the at least one slot related to the at least one first user intent, wherein the at least one slot related to the at least one first user intent is used for performing the at least one first operation based on to the at least one first user intent; and identify, from among the plurality of slots, the at least one slot unrelated to the at least one first user intent by excluding, from the plurality of slots, the at least one slot related to the at least one first user intent, and wherein the one or more instructions, when executed by the at least one processor, further cause the voice assistant device to:

obtain, from the single-intent classifier, the at least one second user intent by inputting, into the single-intent classifier, the at least one slot unrelated to the at least one first user intent and the at least one slot related to the at least one first user intent.

9. The voice assistant device of claim 8, wherein the one or more instructions, when executed by the at least one processor, further cause the voice assistant device to:

identify a correlation between the at least one first user intent and the at least one second user intent;

identify, based on the correlation, an order for performing the at least one first operation and the at least one second operation; and perform, based on the order, the at least one first operation and the at least one second operation.

10. The voice assistant device of claim 8, wherein the one or more instructions, when executed by the at least one processor, further cause the voice assistant device to:

identify the at least one first user intent by inputting the voice input into the single-intent classifier.

11. The voice assistant device of claim 10, wherein the one or more instructions, when executed by the at least one processor, further cause the voice assistant device to:

identify at least one domain based on the at least one first user intent and the at least one second user intent.

12. The voice assistant device of claim 8, wherein the one or more instructions, when executed by the at least one processor, further cause the voice assistant device to:

based on the plurality of slots including the at least one slot unrelated to the at least one first user intent, perform the at least one second operation.

13. The voice assistant device of claim 8, wherein the one or more instructions, when executed by the at least one processor, further cause the voice assistant device to:

based on the plurality of slots not including the at least one slot unrelated to the at least one first user intent, halt the at least one second operation.

14. The voice assistant device of claim 8, wherein the one or more instructions, when executed by the at least one processor, further cause the voice assistant device to identify the at least one second user intent while the at least one first operation is performed.

15. A non-transitory computer readable medium having instructions stored therein, which when executed by at least one processor cause the at least one processor to execute a method for handling voice input by a voice assistant device, the method comprising:

receiving, by the voice assistant device, a voice input from a user, identifying, by the voice assistant device, at least one first user intent and a plurality of slots based on the voice input, wherein the plurality of slots comprises at least one slot related to the at least one first user intent and at least one slot unrelated to the at least one first user intent;

identifying, by the voice assistant device, at least one second user intent based on the voice input and the at least one slot unrelated to the at least one first user intent using a single-intent classifier; and performing, by the voice assistant device, at least one first operation based on the at least one first user intent and at least one second operation based on the at least one second user intent, wherein the identifying, by the voice assistant device, the at least one first user intent and the plurality of slots comprises:

identifying, from among the plurality of slots, the at least one slot related to the at least one first user intent, wherein the at least one slot related to the at least one first user intent is used for the performing the at least one first operation based on the at least one first user intent; and identifying, from among the plurality of slots, the at least one slot unrelated to the at least one first user intent by excluding, from the plurality of slots, the at least one slot related to the at least one first user intent, and wherein the identifying, by the voice assistant device, the at least one second user intent comprises obtaining, from the single-intent classifier, the at least one second user intent by inputting, into the single-intent classifier, the at least one slot unrelated to the at least one first user intent and the at least one slot related to the at least one first user intent.

16. The non-transitory computer readable medium of claim 15, wherein the performing, by the voice assistant device, the at least one first operation and the at least one second operation comprises:

identifying a correlation between the at least one first user intent and the at least one second user intent;

identifying, based on the correlation, an order for performing the at least one first operation and the at least one second operation; and performing, based on the order, the at least one first operation and the at least one second operation.

17. The non-transitory computer readable medium of claim 15, wherein the identifying, by the voice assistant device, the at least one first user intent comprises inputting the voice input into the single-intent classifier, and wherein the identifying, by the voice assistant device, the at least one second user intent comprises inputting, into the single-intent classifier, the at least one slot unrelated to the at least one first user intent and the at least one slot related to the at least one first user intent.

18. The non-transitory computer readable medium of claim 17, wherein the method further comprises:

identifying, by the single-intent classifier, at least one domain based on the at least one first user intent and the at least one second user intent.

19. The non-transitory computer readable medium of claim 15, wherein the method further comprises:

based on the plurality of slots including the at least one slot unrelated to the at least one first user intent, performing, by the voice assistant device, the at least one second operation.

20. The non-transitory computer readable medium of claim 15, wherein the method further comprises:

based on the plurality of slots not including the at least one slot unrelated to the at least one first user intent, halting, by the voice assistant device, the at least one second operation.

* * * * *